(12) United States Patent
Shimanovsky et al.

(10) Patent No.: US 10,891,269 B2
(45) Date of Patent: *Jan. 12, 2021

(54) APPARATUS, SYSTEMS, AND METHODS FOR BATCH AND REALTIME DATA PROCESSING

(71) Applicant: FACTUAL, INC., Los Angeles, CA (US)

(72) Inventors: Boris Shimanovsky, Los Angeles, CA (US); Ahad Rana, Los Angeles, CA (US); Chun Kok, Rowland Heights, CA (US)

(73) Assignee: FACTUAL, INC., New York, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/132,228

(22) Filed: Apr. 18, 2016

(65) Prior Publication Data

US 2016/0232192 A1   Aug. 11, 2016

Related U.S. Application Data

(63) Continuation of application No. 14/214,219, filed on Mar. 14, 2014, now Pat. No. 9,317,541.
(Continued)

(51) Int. Cl.
*G06F 16/21* (2019.01)
*G06N 20/00* (2019.01)
(Continued)

(52) U.S. Cl.
CPC ......... *G06F 16/21* (2019.01); *G05B 13/0265* (2013.01); *G06F 16/23* (2019.01);
(Continued)

(58) Field of Classification Search
CPC ......... G06F 17/30345; G06F 17/30241; G06F 17/30289; G06F 17/30365;
(Continued)

(56) References Cited

U.S. PATENT DOCUMENTS

| 584,791 A | 6/1897 | Propst |
| 5,701,467 A | 12/1997 | Freeston |

(Continued)

FOREIGN PATENT DOCUMENTS

| CN | 102004793 A | 4/2011 |
| CN | 102955792 A | 3/2013 |

(Continued)

OTHER PUBLICATIONS

Anonymous, "SpatialPrefixTree (Lucene 4.0.0 api)," https://web.archive.org/web/20130313072002/http://lucene.apache.org/core/4_0_0/spatial/org/apache/lucene/spatial/prefix/tree/SpatialPrefixTree.html Accessed on Jul. 17, 2017, Published on Mar. 13, 2013, 4 pages.

(Continued)

*Primary Examiner* — Hares Jami

(57) ABSTRACT

A traditional data processing system is configured to process input data either in batch or in real-time. On one hand, a batch data processing system is limiting because the batch data processing often cannot take into account any data received during the batch data processing. On the other hand, a real-time data processing system is limiting because the real-time system often cannot scale. The real-time data processing system is often limited to dealing with primitive data types and/or a small amount of data. Therefore, it is desirable to address the limitations of the batch data processing system and the real-time data processing system by combining the benefits of the batch data processing system and the real-time data processing system into a single data processing system.

21 Claims, 5 Drawing Sheets

Related U.S. Application Data

(60) Provisional application No. 61/799,817, filed on Mar. 15, 2013, provisional application No. 61/800,036, filed on Mar. 15, 2013, provisional application No. 61/799,131, filed on Mar. 15, 2013, provisional application No. 61/799,986, filed on Mar. 15, 2013, provisional application No. 61/799,846, filed on Mar. 15, 2013.

(51) Int. Cl.

| | | |
|---|---|---|
| *G06F 16/23* | (2019.01) | |
| *G06F 16/29* | (2019.01) | |
| *G06F 16/35* | (2019.01) | |
| *G06F 16/28* | (2019.01) | |
| *G06F 16/31* | (2019.01) | |
| *G06F 16/951* | (2019.01) | |
| *G06F 16/2458* | (2019.01) | |
| *G06F 16/2455* | (2019.01) | |
| *G06Q 10/10* | (2012.01) | |
| *G06Q 50/00* | (2012.01) | |
| *G05B 13/02* | (2006.01) | |
| *H04W 4/029* | (2018.01) | |
| *H04W 76/38* | (2018.01) | |
| *H04W 4/50* | (2018.01) | |
| *G06Q 30/02* | (2012.01) | |
| *H04L 12/24* | (2006.01) | |
| *H04W 4/02* | (2018.01) | |
| *H04W 4/021* | (2018.01) | |
| *H04W 8/08* | (2009.01) | |
| *H04W 8/16* | (2009.01) | |
| *H04W 8/18* | (2009.01) | |
| *H04W 16/24* | (2009.01) | |
| *H04W 64/00* | (2009.01) | |
| *H04W 88/02* | (2009.01) | |
| *G06N 5/02* | (2006.01) | |
| *G06F 16/335* | (2019.01) | |
| *H04W 16/00* | (2009.01) | |
| *H04W 16/30* | (2009.01) | |
| *H04W 16/32* | (2009.01) | |
| *H04W 88/00* | (2009.01) | |

(52) U.S. Cl.
CPC ........ *G06F 16/235* (2019.01); *G06F 16/2379* (2019.01); *G06F 16/2386* (2019.01); *G06F 16/2477* (2019.01); *G06F 16/24564* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01); *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.01); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(58) Field of Classification Search
CPC ........... G06F 17/30377; G06F 17/3038; G06F 17/30507; G06F 17/30589; G06F 17/30598; G06F 17/30705; G06F 17/30864; G06F 16/313; G06F 16/35; G06F 16/2477; G06F 16/282; G06F 16/235; G06F 16/951; G06F 16/24564; G06F 16/29; G06F 16/337; G06F 19/00; G06F 16/21; G06F 16/2379; G06F 16/2386; G06F 16/285; G06F 16/23; H04W 4/50; H04W 4/02; H04W 4/021; H04W 4/025; H04W 8/08; H04W 8/16; H04W 8/18; H04W 16/24; H04W 64/00; H04W 64/003; H04W 88/02; H04W 16/00; H04W 16/30; H04W 16/32; H04W 88/00; H04W 4/29; H04W 76/38; G06N 99/005; G06N 20/00; G06N 5/022; G06Q 10/101; G06Q 30/0261; G06Q 30/0282; G06Q 50/01; H04L 41/14; G05B 13/0265
USPC .......................... 707/609, 802, 803
See application file for complete search history.

(56) References Cited

U.S. PATENT DOCUMENTS

| | | |
|---|---|---|
| 6,212,393 B1 | 4/2001 | Suarez et al. |
| 6,317,604 B1 | 11/2001 | Kovach, Jr. et al. |
| 7,058,639 B1 | 6/2006 | Chatterjee et al. |
| 7,096,214 B1 | 8/2006 | Bharat et al. |
| 7,137,065 B1 * | 11/2006 | Huang ............... G06F 16/951 |
| | | 715/205 |
| 7,271,765 B2 | 9/2007 | Stilp et al. |
| 7,330,850 B1 | 2/2008 | Seibel et al. |
| 7,539,666 B2 | 5/2009 | Ashworth et al. |
| 7,576,754 B1 | 8/2009 | Joseph et al. |
| 7,577,680 B1 | 8/2009 | Williams et al. |
| 7,734,661 B2 | 6/2010 | Jordan et al. |
| RE42,285 E | 4/2011 | Anderson et al. |
| 8,015,185 B2 | 9/2011 | Choi et al. |
| 8,046,001 B2 | 10/2011 | Shalmon et al. |
| 8,126,825 B2 | 2/2012 | Guyon |
| 8,195,709 B2 | 6/2012 | Pulfer |
| 8,260,769 B1 | 9/2012 | Narieda et al. |
| 8,301,639 B1 | 10/2012 | Myllykmaki et al. |
| 8,326,845 B2 | 12/2012 | Sethi et al. |
| 8,489,596 B1 | 7/2013 | Milton et al. |
| 8,538,973 B1 | 9/2013 | Gonzalez et al. |
| 8,589,069 B1 | 11/2013 | Lehman |
| 8,670,716 B2 | 3/2014 | Yu et al. |
| 8,751,427 B1 | 6/2014 | Mysen et al. |
| 8,843,315 B1 | 9/2014 | Barbeau et al. |
| 8,855,681 B1 | 10/2014 | George et al. |
| 8,909,255 B1 | 12/2014 | Eriksson et al. |
| 8,918,284 B2 | 12/2014 | Tokashiki |
| 8,977,284 B2 | 3/2015 | Reed |
| 9,063,226 B2 | 6/2015 | Zheng et al. |
| 9,317,541 B2 | 4/2016 | Shimanovsky et al. |
| 9,544,075 B2 | 1/2017 | Altman et al. |
| 9,594,791 B2 | 3/2017 | Bell et al. |
| 9,600,501 B1 * | 3/2017 | Fuller ............... G06F 16/27 |
| 9,686,646 B1 | 8/2017 | Sorden et al. |
| 9,720,555 B1 | 8/2017 | Sorden et al. |
| 9,736,652 B2 | 8/2017 | Su et al. |
| 9,743,236 B1 | 8/2017 | Pecard et al. |
| 9,753,965 B2 | 9/2017 | Rana et al. |
| 9,801,095 B2 | 10/2017 | Henderson et al. |
| 9,906,906 B1 | 2/2018 | Pecard et al. |
| 9,950,532 B2 | 4/2018 | Togashi et al. |
| 9,977,792 B2 | 5/2018 | Bell et al. |
| 10,013,446 B2 | 7/2018 | Rana et al. |
| 10,255,301 B2 | 4/2019 | Bell et al. |
| 10,268,708 B2 | 4/2019 | Rana et al. |
| 10,324,935 B1 | 6/2019 | Patton |
| 10,331,631 B2 | 6/2019 | Michel et al. |
| 10,353,934 B1 | 7/2019 | Mehta et al. |
| 10,397,757 B1 | 8/2019 | Gratton et al. |
| 10,459,896 B2 | 10/2019 | Rana et al. |

(56) References Cited

U.S. PATENT DOCUMENTS

| | | |
|---|---|---|
| 10,484,856 B1 | 11/2019 | Leung et al. |
| 10,579,600 B2 | 3/2020 | Bell et al. |
| 2001/0036224 A1 | 11/2001 | Demello et al. |
| 2002/0138571 A1 | 9/2002 | Trinon et al. |
| 2002/0188581 A1 | 12/2002 | Fortin et al. |
| 2003/0036848 A1 | 2/2003 | Sheha et al. |
| 2003/0135486 A1 | 7/2003 | Edlund et al. |
| 2003/0204484 A1 | 10/2003 | Charpiot et al. |
| 2004/0181526 A1 | 9/2004 | Burdick et al. |
| 2004/0185863 A1 | 9/2004 | Ogami |
| 2004/0254920 A1 | 12/2004 | Brill et al. |
| 2005/0073708 A1* | 4/2005 | Oh .................. G06F 3/1208 358/1.13 |
| 2005/0096997 A1 | 5/2005 | Jain et al. |
| 2005/0134935 A1 | 6/2005 | Schmidtler et al. |
| 2005/0240580 A1 | 10/2005 | Zamir et al. |
| 2006/0004850 A1 | 1/2006 | Chowdhury |
| 2006/0085177 A1 | 4/2006 | Toyama et al. |
| 2006/0149774 A1 | 7/2006 | Egnor |
| 2006/0195565 A1 | 8/2006 | De-Poorter |
| 2006/0248106 A1 | 11/2006 | Miline et al. |
| 2006/0253481 A1 | 11/2006 | Guido et al. |
| 2006/0287810 A1 | 12/2006 | Sadri et al. |
| 2007/0030824 A1 | 2/2007 | Ribaudo et al. |
| 2007/0072582 A1 | 3/2007 | Nurmi |
| 2007/0088603 A1 | 4/2007 | Jouppi et al. |
| 2007/0100796 A1 | 5/2007 | Wang |
| 2007/0149216 A1 | 6/2007 | Misikangas |
| 2007/0245118 A1 | 10/2007 | Suponau et al. |
| 2007/0256006 A1* | 11/2007 | Meyers .............. G06F 17/2288 |
| 2008/0248815 A1 | 10/2008 | Busch |
| 2009/0005968 A1 | 1/2009 | Vengroff et al. |
| 2009/0024546 A1 | 1/2009 | Ficcaglia et al. |
| 2009/0089149 A1 | 4/2009 | Lerner et al. |
| 2009/0119222 A1 | 5/2009 | O'Neil et al. |
| 2009/0124241 A1 | 5/2009 | Krishnaswamy et al. |
| 2009/0125321 A1 | 5/2009 | Charlebois et al. |
| 2009/0132469 A1 | 5/2009 | White et al. |
| 2009/0132605 A1 | 5/2009 | Nielsen |
| 2009/0207021 A1 | 8/2009 | Naccache |
| 2009/0254838 A1 | 10/2009 | Rao et al. |
| 2009/0280829 A1 | 11/2009 | Feuerstein |
| 2009/0282019 A1 | 11/2009 | Galitsky et al. |
| 2009/0299952 A1 | 12/2009 | Zheng et al. |
| 2009/0302952 A1 | 12/2009 | Chan et al. |
| 2009/0319346 A1 | 12/2009 | Fogel et al. |
| 2010/0004997 A1 | 1/2010 | Mehata et al. |
| 2010/0023515 A1 | 1/2010 | Marx |
| 2010/0323715 A1 | 2/2010 | Winters |
| 2010/0079336 A1 | 4/2010 | Skibiski et al. |
| 2010/0185628 A1* | 7/2010 | Weda ............... G06F 17/30843 707/752 |
| 2010/0214117 A1 | 8/2010 | Hazzani |
| 2011/0029853 A1 | 2/2011 | Garrity et al. |
| 2011/0145228 A1 | 6/2011 | Laurenzo |
| 2011/0208427 A1 | 8/2011 | Jansen et al. |
| 2011/0219226 A1 | 9/2011 | Olsson et al. |
| 2011/0225288 A1 | 9/2011 | Easterday et al. |
| 2011/0246059 A1 | 10/2011 | Feuerstein |
| 2011/0313969 A1 | 12/2011 | Ramu |
| 2011/0320319 A1 | 12/2011 | Streich |
| 2012/0028650 A1 | 2/2012 | Cooper et al. |
| 2012/0031032 A1 | 2/2012 | Deiss et al. |
| 2012/0047102 A1 | 2/2012 | Petersen et al. |
| 2012/0047184 A1 | 2/2012 | Purdy |
| 2012/0084280 A1 | 4/2012 | Bouzas et al. |
| 2012/0100869 A1 | 4/2012 | Liang et al. |
| 2012/0110183 A1 | 5/2012 | Miranda et al. |
| 2012/0182144 A1 | 7/2012 | Richardson et al. |
| 2012/0185455 A1 | 7/2012 | Hedrevich |
| 2012/0191696 A1 | 7/2012 | Renkes et al. |
| 2012/0221231 A1 | 8/2012 | Nagata et al. |
| 2012/0221508 A1 | 8/2012 | Chaturvedi et al. |
| 2012/0226622 A1 | 9/2012 | Gonzalez et al. |
| 2012/0260209 A1 | 10/2012 | Stibel et al. |
| 2012/0278767 A1 | 11/2012 | Stibel et al. |
| 2012/0303745 A1 | 11/2012 | Lo et al. |
| 2012/0317110 A1 | 12/2012 | Butterfield et al. |
| 2012/0331014 A1 | 12/2012 | Skubacz et al. |
| 2013/0031032 A1 | 1/2013 | Mehta et al. |
| 2013/0066866 A1 | 3/2013 | Chan et al. |
| 2013/0066912 A1 | 3/2013 | Chetuparambil et al. |
| 2013/0073581 A1 | 3/2013 | Sandholm |
| 2013/0090130 A1 | 4/2013 | Burrell et al. |
| 2013/0103607 A1 | 4/2013 | Knipfer et al. |
| 2013/0103697 A1 | 4/2013 | Hill et al. |
| 2013/0103764 A1 | 4/2013 | Verkasalo |
| 2013/0157693 A1 | 6/2013 | Mercuri et al. |
| 2013/0183998 A1 | 7/2013 | Pylappan et al. |
| 2013/0210463 A1 | 8/2013 | Busch |
| 2013/0226857 A1 | 8/2013 | Shim et al. |
| 2013/0227026 A1 | 8/2013 | Jayaram et al. |
| 2013/0238540 A1 | 9/2013 | O'Donaghue et al. |
| 2013/0246175 A1 | 9/2013 | Bilange et al. |
| 2013/0250851 A1 | 9/2013 | Lakhzouri et al. |
| 2013/0262479 A1 | 10/2013 | Liang et al. |
| 2013/0267255 A1 | 10/2013 | Liu et al. |
| 2013/0304758 A1 | 11/2013 | Gruber et al. |
| 2013/0346347 A1 | 12/2013 | Patterson et al. |
| 2014/0115009 A1 | 4/2014 | Lashley et al. |
| 2014/0128105 A1 | 5/2014 | Su et al. |
| 2014/0270402 A1 | 9/2014 | Bell et al. |
| 2014/0274022 A1 | 9/2014 | Bell et al. |
| 2014/0274154 A1 | 9/2014 | Rana et al. |
| 2014/0278838 A1 | 9/2014 | Novak |
| 2014/0279674 A1 | 9/2014 | Michels et al. |
| 2014/0279757 A1 | 9/2014 | Shimanovsky et al. |
| 2014/0279811 A1 | 9/2014 | Su et al. |
| 2014/0289188 A1 | 9/2014 | Shimanovsky et al. |
| 2015/0081717 A1 | 3/2015 | Pidduck |
| 2015/0319574 A1 | 11/2015 | Wachter et al. |
| 2016/0232192 A1 | 8/2016 | Shimanovsky et al. |
| 2017/0206223 A1 | 7/2017 | Bell et al. |
| 2018/0011888 A1 | 1/2018 | Rana et al. |

FOREIGN PATENT DOCUMENTS

| | | |
|---|---|---|
| WO | WO 2002/010989 A2 | 2/2002 |
| WO | WO 2014/145059 A2 | 9/2014 |
| WO | WO 2014/145069 A1 | 9/2014 |
| WO | WO 2014/145076 A2 | 9/2014 |
| WO | WO 2014/145088 A1 | 9/2014 |
| WO | WO 2014/145104 A2 | 9/2014 |
| WO | WO 2014/145106 A1 | 9/2014 |

OTHER PUBLICATIONS

International Search Report and Written Opinion for International Application No. PCT/US2014/029724, dated Jul. 29, 2014, 11 pages.

Oosterom, V. P. et al., "The Spatial Location Code," Proceedings of the International Symposium on Spatial Datahandling, XP-002293525, Aug. 12, 1996, 12 pages.

Samet, H. "Hierarchical Spatial Date Structures," Computer Science Department, Center for Automation Research and Institute for Advanced Computer Studies, University of Maryland, XP-002566914, Jul. 17, 1989, pp. 193-212.

Smiley, D. "Lucene 4 Spatial," 2012 Basis Technology, Open Source Conference, Oct. 2, 2012, 16 pages.

Varma, H.P. et al., "A Data Structure for Spatio-Temporal Databases," International Hydrographic Review, Monaco, vol. 67, Issue 1, XP000565997, Jan. 1990, pp. 71-92.

Communication pursuant to Rules 161(2) and 162 EPC for European Application No. 14720407.7-1854, dated Nov. 10, 2015, 2 pages.

Communication pursuant to Rules 161(2) and 162 EPC for European Application No. 14720841.7-1951, dated Oct. 30, 2015, 2 pages.

Communication pursuant to Rules 161(2) and 162 EPC for European Application No. 14727983.0-1951, dated Dec. 22, 2015, 2 pages.

(56) References Cited

OTHER PUBLICATIONS

Communication pursuant to Rules 161(2) and 162 EPC for European Application No. 14730242.6-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.0-1951, dated Oct. 30, 2015, 2 pages.
Response to Communication pursuant to Rules 161(2) and 162 EPC for European Application No. 14720407.7-1854, dated May 10, 2016, 3 pages.
Claims for Response to Communication pursuant to Rules 161(2) and 162 EPC for European Application No. 14720407.7-1854, dated May 10, 2016, 4 pages.
Response to Communication pursuant to Rules 161(2) and 162 EPC for European Application No. 14720841.7, dated Apr. 29, 2016, 2 pages.
Claims for Response to Communication pursuant to Rules 161(2) and 162 EPC for European Application No. 14720841.7, dated Apr. 29, 2016, 7 pages.
Specification for Response to Communication pursuant to Rules 161(2) and 162 EPC for European Application No. 14720841.7, dated Apr. 29, 2016, 2 pages.
European Search Report for European Application No. 14720841.7, dated Oct. 6, 2016, 7 pages.
European Search Report for European Application No. 14727983.0-1955, dated Dec. 8, 2016, 9 pages.
Response to Communication pursuant to Rules 161(2) and 162 EPC for European Application No. 14725817.2, dated Jul. 11, 2016, 2 pages.
Claims for Response to Communication pursuant to Rules 161(2) and 162 EPC for European Application No. 14725817.2, dated Jul. 11, 2016, 4 pages.
Response to Communication pursuant to Rules 161(2) and 162 EPC for European Application No. 14725818.0, dated Apr. 29, 2016, 3 pages.
Claims for Response to Communication pursuant to Rules 161(2) and 162 EPC for European Application No. 14725818.0, dated Apr. 29, 2016, 6 pages.
Response to Communication pursuant to Rules 161(2) and 162 EPC for European Application No. 14727983.0, dated Jun. 23, 2016, 3 pages.
Claims for Response to Communication pursuant to Rules 161(2) and 162 EPC for European Application No. 14727983.0, dated Jun. 23, 2016, 7 pages.
Communication pursuant to Article 94(3) EPC for European Application No. 14730242.6, dated Nov. 14, 2016, 4 pages.
Response to Communication pursuant to Article 94(3) EPC for European Application No. 14730242.6, dated Mar. 15, 2017, 12 pages.
Ahmed Metwally, Christos Faloutsos, "V-SMART-Join: A Scalable MapReduce Framework for All-Pair Similarity Joins of Multisets and Vectors," Journal Proceedings of the VLDB Endowment, vol. 5 Issue 8, Apr. 2012, pp. 704-715.
R. Baragalia, G. De Francisci Morales, C. Lucchese, "Document Similarity Self-Join with Map-Reduce," Data Mining (ICDM), 2010 IEEE 10th International Conference on Dec. 13, 2010, pp. 731-736.
Lars Kolb et al., "Learning-based entity resolution with MapReduce," Proceeding CloudDB '11 Proceedings of the third international workshop on Cloud data management, Oct. 24, 2011, pp. 1-6.
Qiaozhu Mei et al., "Automatic Labeling of Multinomial Topic Models," KDD '07 Proceedings of the 13th ACM SIGKDD International conference on Knowledge discovery and data mining, Aug. 12, 2007, pp. 490-499.
Wilson Wong, et al. "Ontology Learning from Text: A Look Back and Into the Future"; ACM Comouting Surveys (CSUR); vol. 44; Issue 4; Article No. 20; Aug. 2012; pp. 20.1-20.36.

International Preliminary Report on Patentability for International Application No. PCT/US14/029713 dated Sep. 15, 2015, 6 pages.
Written Opinion for International Application No. PCT/US14/029713 dated Nov. 5, 2014, 5 pages.
Search Report for International Application No. PCT/US14/029713 dated Nov. 5, 2014, 2 pages.
International Preliminary Report on Patentability for International Application No. PCT/US14/029737 dated Sep. 15, 2015, 7 pages.
Written Opinion for International Application No. PCT/US14/029737 dated Dec. 9, 2014, 6 pages.
Search Report for International Application No. PCT/US14/029737 dated Dec. 9, 2014, 2 pages.
International Preliminary Report on Patentability for International Application No. PCT/US14/029755 dated Sep. 15, 2015, 5 pages.
Written Opinion for International Application No. PCT/US14/029755 dated Sep. 18, 2014, 4 pages.
Search Report for International Application No. PCT/US14/029755 dated Sep. 18, 2014, 4 pages.
International Preliminary Report on Patentability for International Application No. PCT/US14/029784 dated Sep. 15, 2015, 6 pages.
Written Opinion for International Application No. PCT/US14/029784 dated Dec. 17, 2014, 5 pages.
Search Report for International Application No. PCT/US14/029784 dated Dec. 17, 2014, 2 pages.
International Preliminary Report on Patentability for International Application No. PCT/US14/029787 dated Sep. 15, 2015, 4 pages.
Written Opinion for International Application No. PCT/US14/029787 dated Sep. 18, 2014, 3 pages.
Search Report for International Application No. PCT/US14/029787 dated Sep. 18, 2014, 4 pages.
Italiano, et al., "Synchronization Options for Data Warehouse Designs," Computer, IEEE Computer Society, Mar. 2006, pp. 53-57.
International Preliminary Report and Written Opinion for International Application No. PCT/US14/029755 dated Aug. 27, 2014, 10 pages.
International Search Report and Written Opinion issued by ISA Application No. PCT/US14/029787 dated Aug. 13, 2014, 9 pages.
Tian, M. et al., "Efficient algorithms for fast integration on large data sets from multiple sources," BMC Medical Informatics and Decision Making, vol. 12, No. 1, 6 pages (Jun. 28, 2012).
Xuan Liu et al., "CDAS: A Crowdsourcing Data Analytics System", Proceedings of the VLDB Endowment, vol. 5. No. 10, pp. 1040-1051.
Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.
Supplementary European Search Report/Opinion EP14725817, dated Dec. 1, 2016, 6 pages.
Franklin, Michael J., et al. "CrowdDB: answering queries with crowdsourcing." Proceedings of the 2011 ACM SIGMOD.
Juan Ramos, "Using TF-IDF to Determine Word Relevance in Document Queries", The First Instructional Conference on Machine Learning (ICML-2003), proceedings of, Dec. 3, 2003, pp. 1-4.
Marti A. Hearst and Jan 0. Pedersen, "Reexamining the Cluster Hypothesis: Scatter/Gather on Retrieval Results", SIGIR '96 Proceedings of the 19th annual international ACM SIGIR conference on Research and development in information retrieval, Aug. 18, 1996, pp. 76-84.
Stanislaw Osi'nski and Dawid Weiss, "A Concept-driven Algorithm for Clustering Search Results", IEEE Intelligent Systems, vol. 20, Issue 3, Jun. 13, 2005, pp. 48-54.
EP Examination report EP14725817.2 dated Jul. 17, 2018.
Michael J Cafarella: "Extracting and Querying a Comprehensive Web Database", Jan. 1, 2009, pp. 1-7 XP055500317, URL:https://database.cs.wisc.edu/cidr/cidr.
Sebastian Hellmann et al.: "DBpedia Live Extraction", Nov. 1, 2009 (Nov. 1, 2009), On the Move to Meaningful Internet Systems: Otm 2009, Springer Berlin Heidelberg, Berlin, Heidelberg, pp. 1209-1223.

(56) References Cited

OTHER PUBLICATIONS

Anonymous: "Record linkage—Wikipedia", 1-15 Mar. 13, 2013 (Mar. 13, 2013), XP055500110, URL:https://en.wikipedia.org/w/index.php?title=Record_linkage&oldid=543842434.
Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998, pp. 43-52.
Wang, Cong, et al. "Achieving usable and privacy-assured similarity search over outsourced cloud data." INFOCOM, 2012, Proceedings IEEE. IEEE, 2012.
EP Examination report EP18179405, dated Aug. 27, 2018, 9 pages.
Andrei Tamilin et al, Context-aware Mobile Crowdscourcing, PN153073, UBICOMP, 12, pp. 1-4 Sep. 8, 2012.
Office Action, Chinese Patent Application No. 201480014828.0, with English \Translation, dated Jan. 2, 2019.
Geohash, Wikipedia, the :flee encyclopedia, Jun. 16, 2014, 6 pages http://en.wikipedia.org/w/index.php?title=Geohash&oldid=52302473.

\* cited by examiner

APPARATUS, SYSTEMS, AND METHODS FOR BATCH AND REALTIME DATA PROCESSING

CROSS REFERENCE TO RELATED APPLICATIONS

This application claims benefit of the earlier filing date, under 35 U.S.C. §119(e), of:

U.S. Provisional Application No. 61/799,986, filed on Mar. 15, 2013, entitled "SYSTEM FOR ANALYZING AND USING LOCATION BASED BEHAVIOR";

U.S. Provisional Application No. 61/800,036, filed on Mar. 15, 2013, entitled "GEOGRAPHIC LOCATION DESCRIPTOR AND LINKER";

U.S. Provisional Application No. 61/799,131, filed on Mar. 15, 2013, entitled "SYSTEM AND METHOD FOR CROWD SOURCING DOMAIN SPECIFIC INTELLIGENCE";

U.S. Provisional Application No. 61/799,846, filed Mar. 15, 2013, entitled "SYSTEM WITH BATCH AND REAL TIME DATA PROCESSING"; and U.S. Provisional Application No. 61/799,817, filed on Mar. 15, 2013, entitled "SYSTEM FOR ASSIGNING SCORES TO LOCATION ENTITIES".

This application is also related to:

U.S. patent application No. 14/214,208, entitled "APPARATUS, SYSTEMS, AND METHODS FOR ANALYZING MOVEMENTS OF TARGET ENTITIES," filed on the even-date herewith;

U.S. patent application No. 14/214,296, entitled "APPARATUS, SYSTEMS, AND METHODS FOR PROVIDING LOCATION INFORMATION," filed on the even-date herewith;

U.S. patent application No. 14/214,213, entitled "APPARATUS, SYSTEMS, AND METHODS FOR CROWDSOURCING DOMAIN SPECIFIC INTELLIGENCE," filed on the even-date herewith;

U.S. patent application No. 14/214,309, entitled "APPARATUS, SYSTEMS, AND METHODS FOR ANALYZING CHARACTERISTICS OF ENTITIES OF INTEREST," filed on the even-date herewith; and U.S. patent application No. 14/214,231, entitled "APPARATUS, SYSTEMS, AND METHODS FOR GROUPING DATA RECORDS," filed on the even-date herewith.

The entire content of each of the above-referenced applications (including both the provisional applications and the non-provisional applications) is herein incorporated by reference.

FIELD OF THE INVENTION

The present disclosure generally relates to data processing systems, and specifically, to data processing systems that can process data using batch processing and real-time processing.

BACKGROUND

The system disclosed herein relates to receiving, processing and storing data from many sources, representing the most "correct" summary of facts and opinions from the data, including being able to re-compute this in real-time, and then using the results to respond to queries. As an example, when a user inputs a query to a web-based system, mobile phone, or vehicle navigation system searching for a "child friendly Chinese restaurant in Greenwich Village that has valet parking", the system can very quickly respond with a list of restaurants matching, for example, the attributes: {"kid_friendly":true,"category":"Restaurant>Chinese", "valet_parking":true, "neighborhood":"Greenwich Village"}. A mobile phone may then provide a button to call each restaurant. The information describing each restaurant may be spread across many websites, sourced from many data stores, and provided directly by users of the system.

A problem in the art is that all web pages, references, and data about all known businesses in the United States stored in any data store can be so large as to not be understandable and query-able in real-time. Updating and maintaining such a large amount of information can be difficult. For example, information describing businesses in the United States has more than billions of rows of input data, tens of billions of facts, and tens of terabytes of web content.

At the same time, new information is continuously becoming available and it is desirable to include such information in the production of query results. As an example, the system may learn that a restaurant no longer offers valet parking, that the restaurant disallows children, or that the restaurant's phone number has been disconnected.

Accordingly, it is desirable to be able to update a system that produces search results both on an ongoing basis (e.g., to account for newly written reviews) as well as on a whole-sale basis (e.g., to reevaluate the entire data and use information contained within that may have been previously unusable).

SUMMARY OF THE DISCLOSED SUBJECT MATTER

The disclosed system is configured to receive new data (e.g., real-time updates) and old data (e.g., data that has been gathered over a long period of time) and is configured to periodically update the system based on a reevaluation of the new data and the old data.

Unlike systems that can only search web pages and return links to matching web pages, the disclosed system can maintain attribute information about each entity and return the information directly. In conventional systems, a web search for "Chinese restaurant with valet parking", for example, can return links to web pages with the words "Chinese", "restaurant", "valet", and "parking". This will generally include pages with statements like "there was no valet parking to be found" because the words "valet" and "parking" appeared in the text and were therefore indexed as keywords for the web page. By contrast, the disclosed system has attributes such as the category of the restaurant, and a value indicating whether the restaurant offers valet parking, which advantageously allow the system to respond with more meaningful results. Additionally, in the disclosed system, a user can operate as a contributor to correct the data. Also, the disclosed system can interpret facts across many web pages and arrive at a consensus answer, which is then query-able to further improve results.

In embodiments of the disclosed system, a user can operate as a contributor that contributes data to the system. For example, a user may provide direct feedback to the system to correct a fact. Multiple such submissions can be considered together by the disclosed system along with information on websites such as blogs about child friendly restaurants and summarized into a rapidly evolving data store that can quickly respond to queries. Therefore, users of the disclosed system can access the newly corrected phone number and a more accurate assessment of its child-friendliness.

In some embodiments, the disclosed system can improve or expand the analytic methods for understanding information on web pages or feedback. The analytic methods can be improved or expanded on an ongoing basis. For example, today's methods may be capable of extracting more information from a data source compared to the last month's methods. If one web page includes facts as simple text while another has opinions in complex prose, the disclosed system, using the last month's method, may have been able to process simple text data such as "Valet Parking: yes" but have been unable to process prose such as "There was no place to park, not even valet." However, the disclosed system, using the today's method, may have expanded capability and be able to process the more nuanced prose data.

In general, in an aspect, embodiments of the disclosed subject matter can include a computing system for generating a summary data of a set of data. The computing system can include one or more processors configured to run one or more modules stored in non-tangible computer readable medium. The one or more modules are operable to receive a first set of data and a second set of data, wherein the first set of data comprises a larger number of data items compared to the second set of data, process the first set of data to format the first set of data into a first structured set of data, generate a first summary data using the first structured set of data by operating rules for summarizing the first structured set of data, and store the first summary data in a data store, process the second set of data to format the second set of data into a second structured set of data, generate a second summary data based on the first structured set of data and the second structured set of data by operating rules for summarizing the first structured set of data and the second structured set of data, determine a difference between the first summary data and the second summary data, and update the data store based on the difference between the first summary data and the second summary data.

In general, in an aspect, embodiments of the disclosed subject matter can include a method for generating a summary data of a set of data. The method can include receiving, at an input module operating on a processor of a computing system, a first set of data and a second set of data, wherein the first set of data comprises a larger number of data items compared to the second set of data, processing, at a first input processing module of the computing system, the first set of data to format the first set of data into a first structured set of data, generating, at a first summary generation module of the computing system, a first summary data using the first structured set of data by operating rules for summarizing the first structured set of data, maintaining the first summary data in a data store in the computing system, processing, at a second input processing module of the computing system, the second set of data to format the second set of data into a second structured set of data, generating, at a second summary generation module of the computing system, a second summary data using the first structured set of data and the second structured set of data by operating rules for summarizing the first structured set of data and the second structured set of data, determining, at a difference generation module of the computing system, a difference between the first summary data and the second summary data, and updating, by the computing system, the data store based on the difference between the first summary data and the second summary data.

In general, in an aspect, embodiments of the disclosed subject matter can include a computer program product, tangibly embodied in a non-transitory computer-readable storage medium. The computer program product includes instructions operable to cause a data processing system to receive a first set of data and a second set of data, wherein the first set of data comprises a larger number of data items compared to the second set of data, process the first set of data to format the first set of data into a first structured set of data, generate a first summary data using the first structured set of data by operating rules for summarizing the first structured set of data, and store the first summary data in a data store, process the second set of data to format the second set of data into a second structured set of data, generate a second summary data using the first structured set of data and the second structured set of data by operating rules for summarizing the first structured set of data and the second structured set of data, determine a difference between the first summary data and the second summary data, and update the data store based on the difference between the first summary data and the second summary data.

In any one of the embodiments disclosed herein, the second set of data comprises real-time data submissions, and the one or more modules are operable to process the second set of data to format the second set of data into the second structured set of data in response to receiving the second set of data.

In any one of the embodiments disclosed herein, the computing system, the method, or the computer program product can include modules, steps, or executable instructions for processing the first set of data to format the first set of data into the first structured set of data at a first time interval, which is substantially longer than a second time interval at which the second set of data is formatted into the second structured set of data.

In any one of the embodiments disclosed herein, each of the first summary data and the second summary data comprises an entity identifier and a value associated with the entity identifier, and wherein the computing system, the method, or the computer program product can further include modules, steps, or executable instructions for determining the difference between the first summary data and the second summary data by determining that the first summary data and the second summary data include an identical entity identifier, and comparing values associated with the identical entity identifiers in the first summary data and the second summary data.

In any one of the embodiments disclosed herein, the computing system, the method, or the computer program product can include modules, steps, or executable instructions for providing the difference between the first summary data and the second summary data to other authorized computing systems.

In any one of the embodiments disclosed herein, the computing system, the method, or the computer program product can include modules, steps, or executable instructions for providing the difference to other authorized computing systems via an application programming interface.

In any one of the embodiments disclosed herein, the computing system, the method, or the computer program product can include modules, steps, or executable instructions for providing the difference to other authorized computing systems as a file.

In any one of the embodiments disclosed herein, the computing system, the method, or the computer program product can include modules, steps, or executable instructions for combining at least the first set of data and the second set of data to generate a third set of data, processing the third set of data to format the third set of data into a third structured set of data based on new rules for formatting a set of data, and generating a third summary data using the third structured set of data.

In any one of the embodiments disclosed herein, the first set of data and the third set of data each includes a first data element, and wherein the first data element is associated with a first entity in the first summary data identified by the first entity identifier, wherein the first data element is associated with a second entity in the third summary data, and wherein the computing system, the method, or the computer program product can further include modules, steps, or executable instructions for associating the first entity identifier to the second entity in the third summary data so that the first data element maintains its association with the first entity identifier in the third summary data.

In any one of the embodiments disclosed herein, the first structured set of data comprises a grouping of data items based on an entity identifier associated with the data items.

In any one of the embodiments disclosed herein, the computing system comprises at least one server in a data center.

In any one of the embodiments disclosed herein, the data store comprises a plurality of data store systems, each of which is associated with a view, and wherein the one or more modules are operable to select one of the plurality of data store systems in response to a query based on the view associated with the query.

In any one of the embodiments disclosed herein, the computing system, the method, or the computer program product can include modules, steps, or executable instructions for identifying a third set of data received after the generation of the second summary data, generating a third summary data based on the third set of data, the first structured set of data, and the second structured set of data by operating rules for summarizing the first structured set of data, the second structured set of data, and the third summary data, determining a difference between the second summary data and the third summary data, and updating the data store based on the difference between the second summary data and the third summary data.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the disclosed subject matter, the scope of which is set forth in the claims that follow.

DETAILED DESCRIPTIONS

Figure 1:
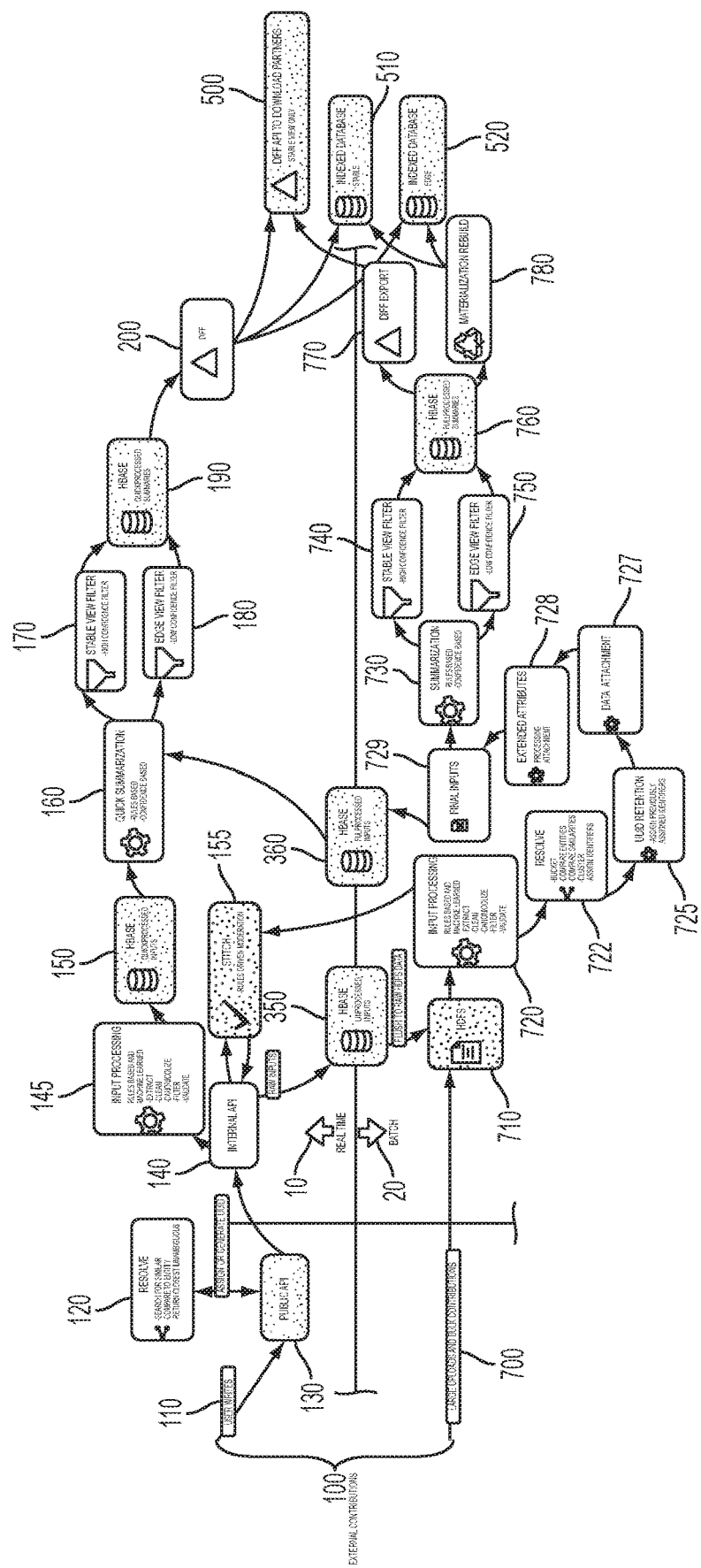
FIG. 1 illustrates the common processing framework of the disclosed system in accordance with some embodiments.

A traditional data processing system is configured to process input data either in batch or in real-time. On one hand, a batch data processing system is limiting because the batch data processing cannot take into account any additional data received during the batch data processing. On the other hand, a real-time data processing system is limiting because the real-time system cannot scale. The real-time data processing system is often limited to dealing with primitive data types and/or a small amount of data. Therefore, it is desirable to address the limitations of the batch data processing system and the real-time data processing system by combining the benefits of the batch data processing system and the real-time data processing system into a single system.

It is hard for a system to accommodate both a real-time processing and a batch processing because the data and/or processes for a real-time processing and a batch processing are quite different. For example, in a batch processing system, a program cannot access the data processing result until the entire data process is complete, whereas in a real-time processing system, a program can access the processing result during the data processing.

The disclosed data processing apparatus, systems, and methods can address the challenges in integrating the batch data processing system and the real-time processing system.

Some embodiments of the disclosed system can be configured to process unstructured data and convert the unstructured data into a summary data. The summary data can be stored in one or more data stores, including, for example, one or more data storages and/or one or more databases, or one or more search servers and can be formatted and optionally indexed to be query-able using one or more data stores or one or more search servers or using an application programming interface (API) by a third party user.

The summary data can include one or more unique entities and at least one attribute about those entities. One of the attributes about an entity can be an entity identifier that is unique amongst the entities. Additional attributes describe some properties of the entity such as a Boolean value (e.g. whether restaurant A has valet parking is "True" or "False"), an integer, a string, a set of characters, binary data (e.g. bytes representing an image), or arrays or sets of these types, or any other combinations thereof.

Some embodiments of the disclosed system can be configured to generate the summary data based on two types of data inputs: a bulk data input and an intermittent data input. The bulk data input can refer to a large amount of data that has been gathered over time. In some cases, the bulk data input can refer to all data that the disclosed system has received over a predetermined period of time, which can be long. For example, the bulk data input can include raw information received from multiple contributors or from a web-crawler over a long period of time. In some embodiments, the bulk data can be maintained in the disclosed system itself; in other embodiments, the bulk data can be received from another storage center via a communication interface. The intermittent data input can include a small amount of data that is provided to the disclosed system. The intermittent data input can include, for example, real-time data submissions from contributors.

Some embodiments of the disclosed system can be configured to process both types of data inputs using a common processing framework. The common processing framework can include a real-time system that can respond to the intermittent data input (e.g., small incremental contributions from contributors) and reflect changes based on those contributions in consideration along with data from the batch system in the summary data in substantially real-time. The common professing framework can also include a batch system that can process the bulk data input. The batch system can be configured to format the bulk data to be amenable for further processing, and use the formatted bulk data to generate summary data.

In some embodiments, the batch processing system is configured to generate summary data by formatting the unstructured data in the bulk data inputs into a structured data. Then the batch system is configured to group the elements in the structured data and generate a representative identifier for each group, also referred to as an entity. The batch system can then generate an identifier for each entity and calculate attribute values describing each entity.

For example, when the large bulk data input includes 5 data elements associated with an existence of valet parking at a restaurant A, then the batch system can determine that those 5 data elements belong to the same entity (e.g., restaurant A), and consolidate information associated with the 5 data elements. For instance, if 3 data elements indicate that the restaurant A has valet parking and 2 data elements indicate that the restaurant A does not have valet parking, then the batch system can consolidate the 5 elements and indicate that the attribute "valet parking" for entity, restaurant A is "True." This consolidation process is, in some ways, similar to the process disclosed in U.S. Patent Application Publication No. 2011/0066605, entitled "PROCESSES AND SYSTEMS FOR COLLABORATIVE MANIPULATION OF DATA," filed on Sep. 15, 2009, which is herein incorporated by reference in its entirety.

In some embodiments, an entity is a distinct object that the system elects to track. For example, the system can consider each physical restaurant (e.g. a chain with multiple locations would have an entity for each location) as a separate entity (i.e. summary record) when the system receives reviews about each physical restaurant as data input. Similarly, when toothpaste from a particular brand comes in 3 sizes and 4 flavors for each size, the system can maintain 12 distinct entities for the toothpaste.

In some embodiments, the real-time system can be configured to update the summary data generated by the batch system as the real-time system receives intermittent data inputs from contributors. For example, if the real-time system receives two additional data inputs from the contributors, both indicating that the restaurant A does not have valet parking, then the real-time system can update the summary data to indicate that the attribute "valet parking" for entity "restaurant A" is "False."

In some embodiments, the real-time system can be configured to leverage the structured data generated by the batch system. For example, when the real-time system receives intermittent data input from a contributor, the real-time system can consolidate the intermittent data input with the structured bulk data generated by the batch system. This way, the amount of computation required by the real-time system can be reduced.

In some embodiments, the batch system can be configured to run periodically, with a predetermined period. The batch system can be operated less frequently compared to the real-time system since the amount of computation needed by the batch system is considerably larger compared to the amount of computation needed by the real-time system. For example, the batch system can be operated so as to update the system on schedules like once an hour, once a week, or once a month. The real-time system can be operated more frequently than the batch system. For example, the real-time system can be configured to operate whenever the real-time system receives an intermittent data input, or on inputs buffered over a short time frame such as 5 seconds or 5 minutes. The batch system can be updated with new intelligence and rules over time and can process new data provided at a scale that is beyond the capacity of the real-time system.

Figure 2A:
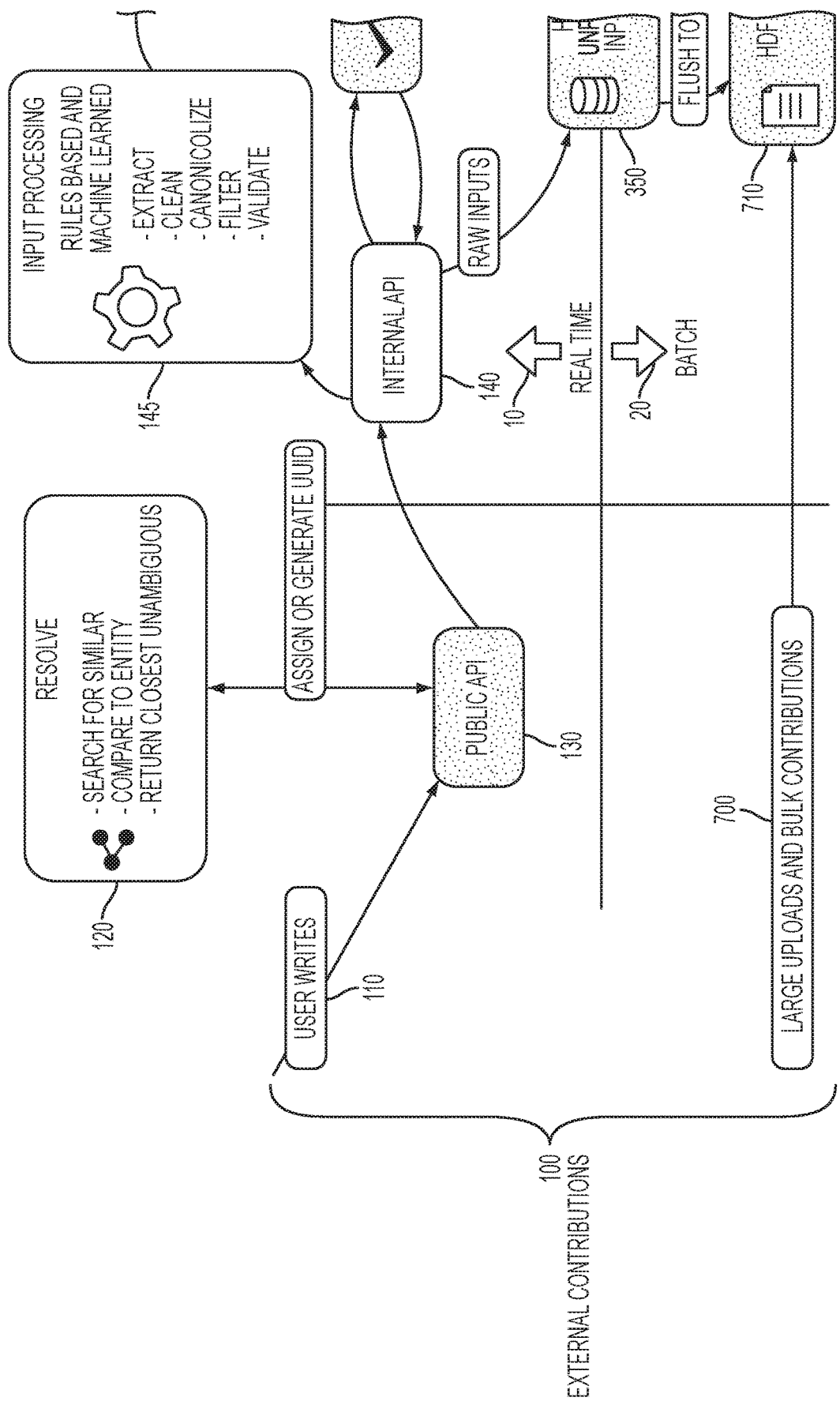
FIGS. 2A-2C illustrate enlarged views of portions of FIG. 1.
Figure 2B:
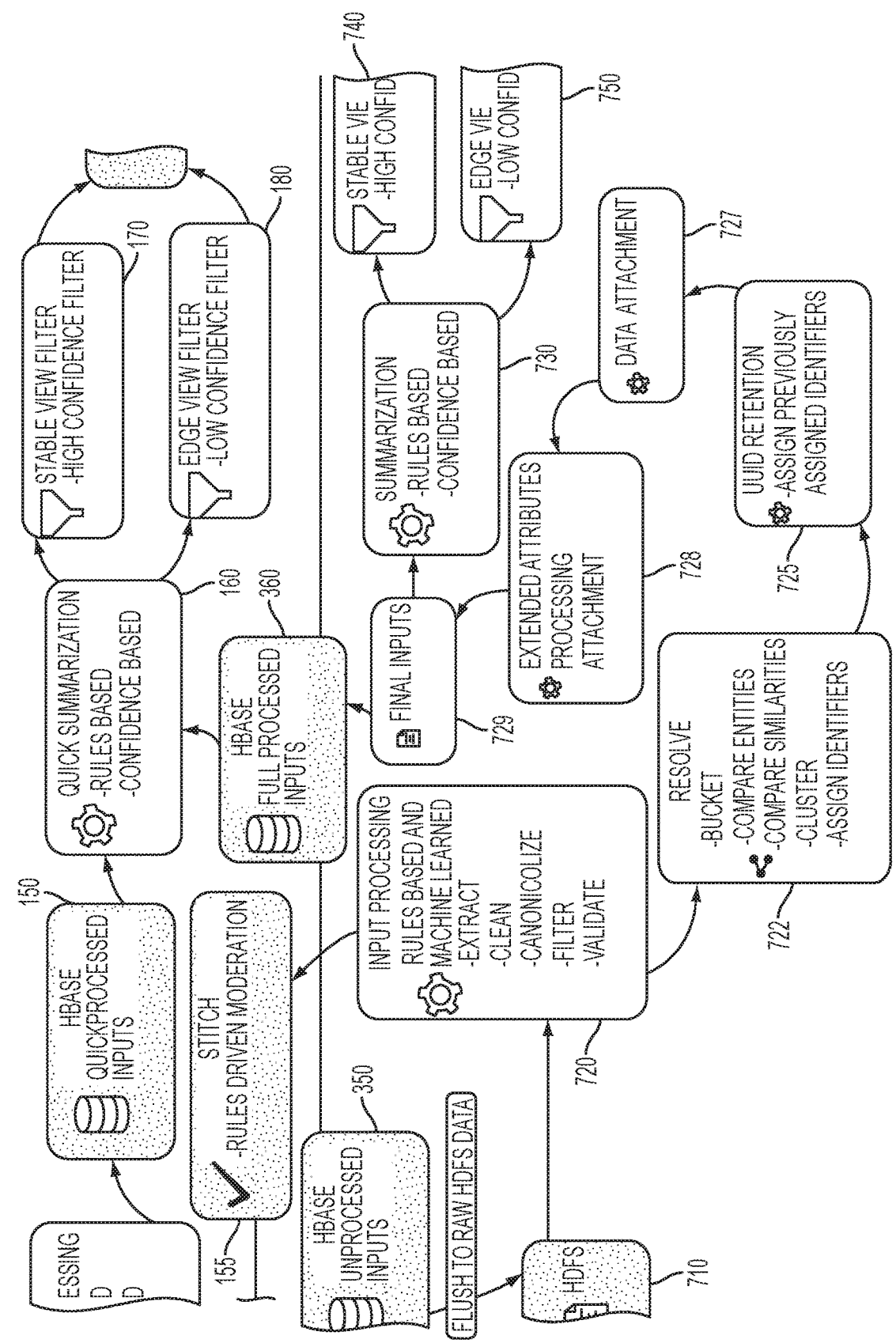
Figure 2C:
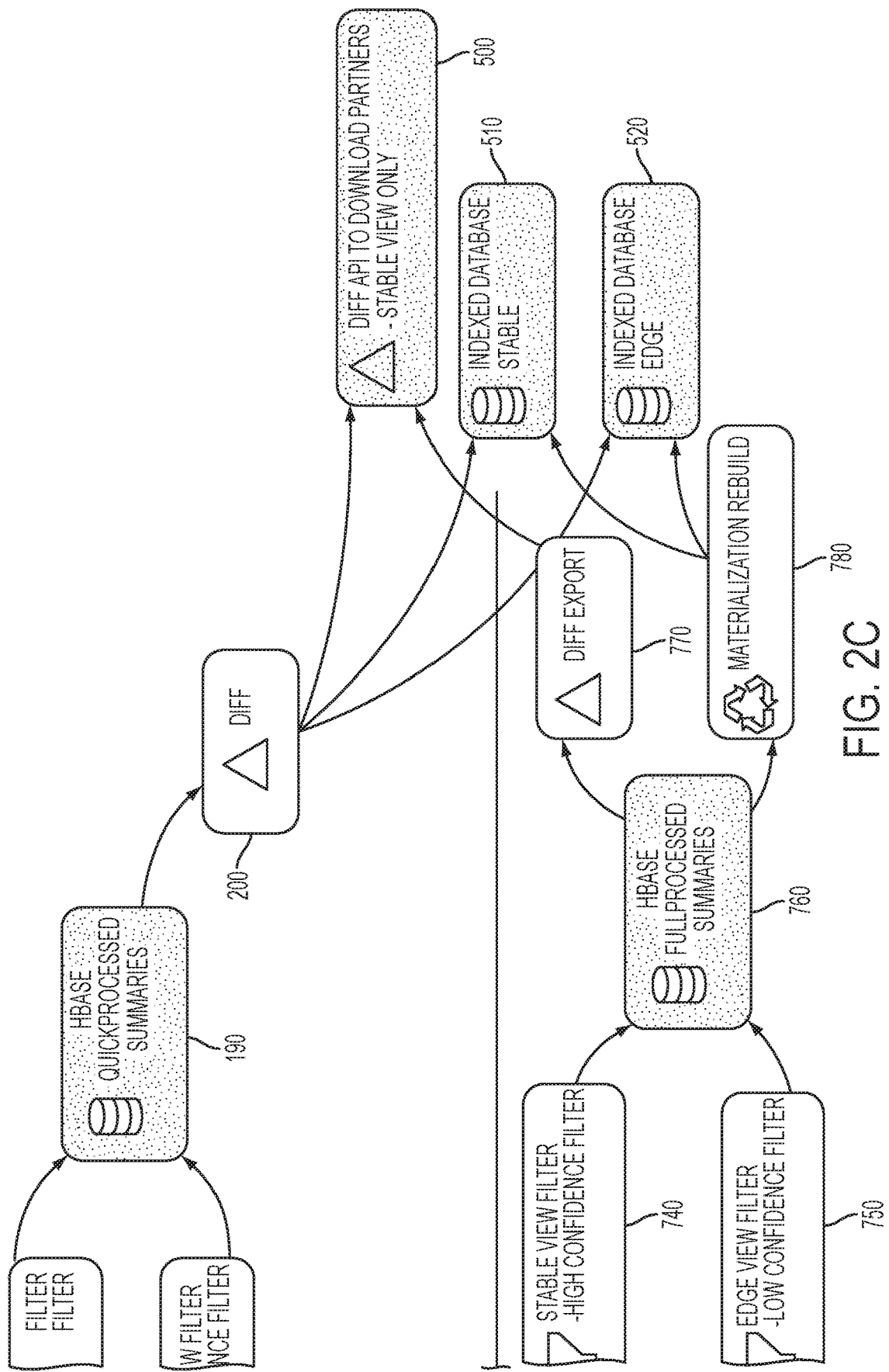

FIG. 1 illustrates the common processing framework of the disclosed system in accordance with some embodiments. FIGS. 2A-2C illustrate enlarged views of portions of FIG. 1. The top portion of FIG. 1 illustrates the processing performed by the real-time data system, whereas the bottom portion of FIG. 1 illustrates the processing performed by the batch system.

Data Lifecycle

One aspect of the disclosed data processing system is the data lifecycle. A data can be categorized as one of following types as the data progresses through the disclosed data processing system: Raw/Unprocessed Data 100 (see FIG. 2A), Unprocessed (Raw) Inputs 350 (see FIG. 2B), QuickProcessed Inputs 150 (see FIG. 2B), QuickProcessed Summaries 190 (see FIG. 2C), FullProcessed Inputs 360 (see FIG. 2B), and FullProcessed Summaries 760 (see FIG. 2C). These data can be stored in a non-transitory computer readable medium. The non-transitory computer readable medium can include one or more of a hard disk, a flash memory device, a dynamic random access memory (DRAM), a static random access memory (SRAM), or any combinations thereof.

Raw/Unprocessed Data

Raw/Unprocessed Data 100 is a data that is in a raw/unprocessed form. For example, a web page about a restaurant might say somewhere in the content of the webpage "has valet parking." In this case, the raw data is a copy of the entire web page. In the disclosed system, an input of {"valet_parking":true} could, for example, originate from a webpage that said "has valet parking." As an additional example, the system may contain a data store of restaurants, for example, a data storage having restaurant-related data and/or a database having restaurant-related data. Examples of unprocessed data can include:

The Internet home pages of restaurants in the data store
Reviews of the restaurants that appear in on-line blogs
Reviews of the restaurants provided by individuals hired to provide data for the system
On-line articles about restaurants in the data store In the disclosed system, Raw/Unprocessed Data 100 can be maintained for reprocessing (e.g., the raw data may be stored at periodic intervals so that it can be used for new runs of the batch processing system). This is advantageous because new rules, which may be developed at a later time, may be able to extract additional inputs when the raw data is reprocessed. For example, a website may have text saying "the valet scratched my car while parking it." Even if an earlier run that evaluated content on the website failed to form any inputs about valet parking, a subsequent run may extract an input of "valet_parking":true. Because the disclosed system can store the raw data 100 for reprocessing, a batch process of the disclosed system can be rerun against raw data 100, and a new rule that understands the more complex statement could, for example, extract an input of "valet_parking":true on a subsequent run.

Unprocessed (Raw) Inputs

Unprocessed Inputs 350 represent the original attribute values for an entity as they were received by the disclosed system from a contributor, third party system, web page, and/or any other suitable source of information. For example, if a webpage stated somewhere in the content of the webpage "has valet parking," the statement "has valet parking" is an Unprocessed Input. Likewise, a website about a clothing store (raw data) might contain the statement "50 percent off sale" (raw input). As another example, a contribution, from a contributor, updating the address of a business may contain "1801 ave of stars, los angeles". Initially, the rules available when the data was first provided may have caused this input to be ignored because the address is insufficient. However, a subsequent build with improved rules could refine it to be {"address":"1801 Avenue of the Stars", "city":"Los Angeles","state":"CA","zipcode":"90067"}.

Unprocessed Inputs 350 may, for example, be stored in one or more of the following: a file system, including a distributed file system, a data store, such as a relational or non-relational (i.e. nosql) database.

FullProcessed Inputs and Summaries

FullProcessed Inputs 360 are Inputs that have been Processed in the most recent Batch Data Build. For example, if the raw input "has valet parking" were contained in an online restaurant review, the Batch Data Build of the disclosed system could extract an processed input of "valet_parking":true.

In some embodiments, each Batch Data Build may entirely replace the previous set of Full Processed Inputs 360. For example, suppose the disclosed system had entries for just one restaurant called "Joes" and five websites provided facts about the restaurant. Two websites might state that the type of food served is "Chinese". One website might state that it's "Cantonese". Another two websites might say that it is "Italian". In this example, FullProcessed Inputs could include {"id":"1","name":"Joe's", "cuisine":"Chinese", "source":"website1"}, {"id":"1","name":"Joe's", "cuisine":"Chinese", "source":"website2"}, {"id":"1","name":"Joe's", "cuisine":"Cantonese", "source":"website3"},{"id":"1","name":"Joe's", "cuisine":"Italian", "source":"website4"}, {"id":"1", "name":"Joe's", "cuisine":"Italian", "source":"website5"}. Based on the current rules, the FullProcessed Summary 760 may have {"id":"1", "name":"Joe's", "cuisine":"Italian"} because it trusted all contributions equally and "Italian" and "Chinese" were tied while "Cantonese" was treated as an independent cuisine. In this example, a rule could be improved to determine that "Cantonese" is a type of "Chinese" cuisine and is also more specific, resulting in a FullProcessed Summary 760 of
{"id":"1", "name":"Joe's", "cuisine": "Chinese>Cantonese"}
when the Batch Data Build is run. In the disclosed system, FullProcessed Inputs 360 and FullProcessed Summaries 760 can change when the entire table containing them is replaced while new incremental information is written to QuickProcessed tables.

QuickProcessed Inputs and Summaries

At the start of a Batch Data Build, QuickProcessed Inputs 150 and QuickProcessed Summaries 190, which represent the newly computed Inputs and Summaries since the start of the previous Batch Data Build, may be set aside or discarded, and an empty version of each of QuickProcessed Inputs 150 and QuickProcessed Summaries 190 may be allocated in the data store, such as a database. For example, a user on a mobile device might notice that "Joe's" restaurant is miscategorized as "Italian". That user, acting as a contributor, could submit a correction through software on her mobile device that sends the data to the Public application programming interface (API) (FIG. 1, 130.) That contributor's input could look like {"id":"1","cuisine":"Chinese"}. Once that input is processed, it could be saved to QuickProcessed Inputs 150 and the entry for "Joes" could be re-Summarized. In this example, the new Summary for "Joes" would then be {"id":"1","name":"Joe's","cuisine":"Chinese"} and because it is different than the previous FullProcessed Summary 760, the new Summary would be saved to QuickProcessed Summaries 190. In the disclosed system, when determining the latest Summary for an entity, the system can check for the latest Summary in QuickProcessed Summaries 190 favoring that over the FullProcessed Summary 760 which only changes in a Batch Data Build.

Batch Processing and Lifecycle

From time to time, a Batch Data Build may be run to convert Unprocessed Data and Inputs into finished view Summary Data. The output of a Batch Data Build is FullProcessed Inputs 360 and FullProcessed Summaries 760.

Input Processing Block

In some embodiments, the Input Processing module 145, 720 can be configured to perform one or more of the extraction process, the cleaning process, the canonicalization process, the filtering process, and the validation process, each of which is described below.

Extraction

The Extraction step may, for example, include a selection of a fact for an attribute based on a matching rule from structured, semi-structured, and unstructured data. For example, the disclosed system could use the fact matching rule "name: [NAME]" to extract a name. In this example, the Extraction step includes selection of the name "Mc'Donalds" in a record like: {"name":"Mc'Donalds"} using the fact matching rule "name:[NAME]." Additionally, in the Extraction step, the system could use a pattern matching rule like "*-*-****", where the * symbol represents a wildcard character, to select the phone number "123-456-7890" from text such as: "Tel: 123-456-7890." As an additional example, the Extraction step could interpret raw text like "This place has no high chairs for my children" to create a fact in the form: {"kid_friendly":false}. The disclosed system can interpret raw text to create a rule by, for example, using advanced natural language processing and parsing.

Cleaning

The Cleaning step comprises cleaning extracted data. Cleaning extracted data may include a process to remove undesired or bad characters or entity attributes. For example, extraction of a fact matching the rule "Phone: [PHONE_NUMBER]" might incorrectly extract incorrect information such as "Phone: call now!" or extract extra information like "Phone:123-456-7890 click here". Cleaning can discard incorrect data or remove extra data that is not desired. For example, if "Phone: call now!" were extracted, the Cleaning step could discard the data because "Phone: call now!" is incorrect data for a phone number. Additionally, if "Phone:123-456-7890 click here" were extracted, the Cleaning step could discard "click here" because "click here" is extra data that is not part of the extracted phone number. In the disclosed system, incorrect data or extra data can be discarded or removed by, for example, using two rules, such as a fact matching rule and a pattern matching rule. For example, using the fact matching rule "Phone: [PHONE_NUMBER]," the disclosed system could extract information like "Phone:123-456-7890 click here" and using the pattern matching rule "*-*-****," the system could determine that "click here" is extra data and remove it during the Cleaning step.

Canonicalization

Canonicalization refers to a rules-driven step to convert data in various formats into their preferred or canonical representation. For example, one contributor may describe a phone number as "123-456-7890" and a different contributor may submit "(123)456-7890". Converting data into a canonical representation makes it uniform and enables better entity resolution and summarization. The disclosed system can perform canonicalization by, for example, using multiple pattern matching rules and designating another pattern for the canonical representation. For example, using the pattern matching rule "*-*-**" and "(*)*-**," with the former designated the canonical representation, the Canonicalization step could make the inputs "123-456-7890" and "(123)456-7890" uniform by representing them both as "123-456-7890."

Filtering

Filtering refers to a rules-driven step to reject data that is not necessarily incorrect, but does not meet some desired criteria. This can include rejecting inputs that don't match a particular category or have insufficient confidence. For example, a Science Fiction theme restaurant might advertise that it is "located on the planet Earth in the Milky Way galaxy." While this statement is accurate, an embodiment of the disclosed system might, for example, not have a category for the planet and galaxy where restaurants are located, and as such, the Filtering step in this example would reject the input "located on the planet Earth in the Milky Way galaxy." Of course, in alternate embodiments, the disclosed system could have such categories. As an additional example, in an embodiment, the disclosed system could, for example, set a threshold of 100 visits for information from a website to be considered reliable. In this example, if a website that had been visited only 15 times contained the statement "it is the best store," the system could reject the input because it does not meet the confidence rule. In other embodiments, the disclosed system could use other rules for determining confidence.

Validation

Validation refers to a rules driven step to reject data based on non-conformance with certain criteria. For example, a phone number field where, after canonicalization, the phone number has fewer digits than are expected for a valid phone number (e.g. Phone: 123), it is possible to reject the attribute or the entire input based on failure to meet certain criteria.

Real-Time Summarization

Embodiments of the disclosed system may perform a Real-time Summarization process. Referring to FIGS. 1 and 2, in embodiments of the disclosed system, the Quick Summarization process module 160 receives QuickProcessed inputs 150, generated by the Input Processing module 145, and FullProcessed inputs 360, generated by the batch processing system.

The Quick Summarization process module 160 can be configured to aggregate and filter the QuickProcessed inputs 150 and FullProcessed inputs 360. For example, the Quick Summarization process 160 could receive QuickProcessed inputs 150 and FullProcessed inputs 360 regarding valet parking. In this example, FullProcessed inputs 360 might include inputs with the value "valet_parking":false and QuickProcessed input 150 might include inputs with the "valet_parking":true. The Quick Summarization process module 160 can be configured to aggregate and filter the QuickProcessed inputs 150 and the FullProcessed inputs 360 to create a QuickProcessed Summary 190. For example, after filtering and processing, the QuickProcessed Summary 190 for an entity might be "valet_parking":true.

In some embodiments, the Quick Summarization process module 160 can be configured to maintain and index data in the QuickProcessed Inputs 150 and the FullProcessed Inputs 360 in a sort order determined based, at least in part, on one or more of the entity identifier, the identifier of the contributor or a user account that provided the data, the technology used to extract the data, the source or citation for the data, and/or a timestamp. To this end, a connection or iterator is created to read data simultaneously starting from the first Input with the desired entity identifier from both the QuickProcessed Inputs and the FullProcessedInputs. In each case, the iterator is advanced on either QuickProcessed Inputs or FullProcessed Inputs, whichever has the earlier timestamp. Whenever any of the attributes enumerated above except for the timestamp change, the previous input is added to the pool being considered while the others are ignored, thus allowing the system to efficiently consider only the latest version of an input from a given user, extraction technology, and citation.

The Diff process module 200 can be configured to compare QuickProcessed Summaries 190, generated by the Quick Summarization process module 160, and the FullProcessed Summaries 760. For example, it might compare a QuickProcessed Summary 190 with the value "valet_parking":true and a FullProcessed Summary 760 with a value "valet_parking":false. Based on the comparison, the Diff process module 200 could then broadcast the result. For example, it could broadcast that the FullProcessed Summaries 770 from the previous batch build indicates that there is no valet parking, whereas the QuickProcessed Summary 190 from the newly computed Inputs and Summaries since the start of the previous Batch Data Build, indicates that there is valet parking.

Real-Time Processing Workflow

Referring to FIGS. 1 and 2, as indicated by the arrow Real-time 10, the upper portion of the diagram generally depicts real-time components of the system. The system receives External Contributions 100 as inputs. External Contributions 100 include bulk data contributions, web documents, and real-time submissions from contributors. For example, the system can receive bulk data contributions such as entire websites or data stores, web documents such as individual web pages, and real-time submissions such as reviews on a website.

One source of External Contributions 100 are User Writes 110. User Writes 110 could include, for example, direct input from contributors on a web form or a mobile device.

In some embodiments, the system can receive User Writes 110 via Public API module 130. For example, User Writes 110 could be received through a publicly accessible endpoint such as a website that submits to the Public API module 130 or through software on a website or mobile device that submits to the Public API module 130. User Writes 110 may include identifiers for the contributor, origin, and developer added to them for consideration in summarization.

An input such as a User Write 110 may have an entity identifier (e.g., entity_id) already included with it. An entity identifier can be a string of letters and numbers. In some embodiments, an entity identifier can signify that the input is an update to an existing entity. If the input does not have an identifier, the system can determine and assign a temporary identifier, referred to as a QuickProcessed Identifier, using the Resolve process module 120. The Resolve process module 120 can be configured to assign an entity identifier to an input or to match one representation of a record to another. This makes it possible to cluster similar inputs together and assign those that reference the same entity with a common entity identifier. In many cases, inputs have different attributes but reference the same entity. The Resolve process can be used to compare inputs, determine that the inputs reference the same entity, and assign a common entity identifier to those inputs.

In some cases, the Resolve process module 120 can be configured to assign an identifier as a surrogate key generated by a) random assignment, b) concatenating one or more input attributes (e.g. name+address), c) consistent hashing of one or more input attributes (e.g. md5(name+address)), or d) taking the assigned id of an existing input if a sufficiently similar input exists (e.g. name, value, phone of new input is similar enough to name, value, phone of existing input) and generating a new surrogate key when it is not.

Once a QuickProcessed Identifier is determined for the input, Internal API module 140 can receive the input from Public API module 130. Before it is saved to storage, a copy of the original input, in its raw form, can be made. The raw copy can be saved to storage for Unprocessed Inputs 350 so that it can later be reprocessed in batch with updated software or subjected to more expensive computation, including software that does entity identifier assignment.

Additionally, Internal API module 140 can be configured to interact with the Stitch process module 155 for rules driven moderation. The Stitch process module 155 for rules driven moderation can be configured to display or provide data submissions that match certain criteria to a human moderator or more expensive machine processes for further evaluation. For example, a new restaurant owner might wish to drive business to his restaurant by diverting it from nearby restaurants. That restaurant owner might sign up for an account as a contributor of one of the disclosed system's customers and submit information that all of the other restaurants are closed. The system could then determine that a new contributor who has never interacted with the system has, on one day, reported that several local businesses have closed, causing a rule in the system that looks for such patterns to flag those submissions and enqueue them for review by a human moderator. The human moderator could in turn determine that the businesses are indeed still open and reject the submissions and further blacklist the contributor such that additional submissions will be ignored.

At the same time, the original raw input can be processed through software that performs Extraction, Cleaning, Canonicalization, and Validation, as described above, producing a QuickProcessed Input 150. In some cases, the QuickProcessed Input 150 may have a QuickProcessed Identifier attached. If the QuickProcessed Input passes Validation, it can be saved to storage for QuickProcessed Inputs 150 and it can move forward in the process to QuickSummarization process module 160.

Real-time QuickSummarization process module 160 can be configured to analyze and combine the QuickProcessed Inputs 150 and FullProcessed Inputs 360 for an entity in substantially real-time. QuickProcessed Inputs 150 can represent new real-time inputs since the last Batch Data Build process. FullProcessed Inputs 360 are inputs generated from a previous Batch Process by the batch processing system. Together, they comprise the full set of Inputs for each entity. For example, the Real-time QuickSummarization process module 160 could receive QuickProcessed inputs 150 and FullProcessed inputs 360 regarding valet parking. In this example, FullProcessed inputs 150 might include inputs with the value "valet_parking":false and QuickProcessed input 360 might include inputs with the "valet_parking": true. The QuickSummarization process module 160 could then aggregate the QuickProcessed inputs 150 and FullProcessed inputs 360 and then filter them using High Confidence Filter 170 and Low Confidence Filter 180 to create a QuickProcessed Summary 190. For example, after filtering and processing, the QuickProcessed Summary 190 for an entity might be "valet_parking":true.

QuickProcessed Inputs and FullProcessed Inputs may be stored in a data store 150, 360. The data store 150, 360 can be respectively clustered by an entity identifier (e.g. a uuid such as 0e3a7515-44e0-42b6-b736-657b126313b5). This can allow re-Summarization to take place quickly as new Inputs are received such that Inputs only pertaining to an entity for which a new Input has been received are processed. QuickProcessed Inputs 150 and FullProcessed Inputs 360 may be stored in a sort order such that it facilitates processing the data in streams or skipping over Inputs that are determined to be superseded by Inputs that are, for example, newer submissions from the same submitter or citing an identical reference.

In some embodiments, the QuickSummarization process module 160 can read Inputs concurrently from the QuickProcessed Input data store 150 and FullProcessed Input data store 360, to facilitate choosing only the Inputs that need to be considered in Summarization. The summarization of the Inputs can be represented or displayed using a view (e.g., a materialized view). A view is one possible summarization of the Inputs and representation of entities according to one or more rules. The one or more rules can determine which entities are included, which attributes are included for each entity, what indexing optimizations are performed, and what additional attributes and attribute variations are computed for each entity. In some embodiments, a view is uniquely identified by a view_id. Data stores often track views in system tables and these system tables contain metadata about views. In our case, a view is assigned an identifier and that identifier is used to lookup metadata about the view from the data stores, such as the names of the attributes, their datatype, sort preferences, indexing rules, etc.

For each view associated with the dataset to which the Input was assigned, a QuickSummarization Process can be performed. Views may have different rules about attributes to be computed, the rules that apply to those attributes, confidence thresholds 170,180 for the Summary entity, and other software rules and transformations. Each QuickSummarization process can produce a QuickProcessed Summary for each View. Each QuickProcessed Summary is compared to the most recent Summary retrieved from the QuickProcessed Summary data store 190 or the FullProcessed Summary data store 760. If the QuickProcessed Summary is different than the previous version, the new QuickProcessed Summary is saved to the QuickProcessed Summary data store 190 and a Diff record is produced. A Diff record can include a row of data that includes, for example, (1) an entity identifier of the entity whose attributes have changed and (2) the changed attributes. The Diff record may include an entire copy of the new Summary or the attributes that are different from the previous Summary. The Diff record is saved to a Diff data store and published over the network to processes that listen for Diff records and update Materializations of Summary data.

The following is an example of a Diff record in one possible embodiment: {"timestamp":1363321439041, "payload": {"region":"TX", "geocode_level":"front_door", "tel":"(281) 431-7441", "placerank":90,"category_labels": [["Retail","Nurseries and Garden Centers"]], "search_tags": ["Houston","Grass","South"],"name":"Houston Grass", "longitude":"−95.464476", "fax":"(281) 431-8178", "website":"http://houstonturfgrass.com", "postcode": "77583", "country":"us", "category_ids":[164],"category": "Shopping>Nurseries & Garden Centers","address":"213 McKeever Rd", "locality":"Rosharon", "latitude": "29.507771"}, "type":"update","factual_id":"399895e6-0879-4ed8-ba25-98fc3e0c983f", "changed": ["address", "tel"]}. In this example, the Diff record indicates that the address and telephone for Houston Grass have changed, which can result in an update to each copy of the materialized data store or index rows for that entity.

Embodiments of the disclosed system may include materialized data stores or indexes 510, 520. Materialized data stores or indexes 510, 520 are searchable relational or non-relational data stores or search index servers. In some embodiments, the materialized data stores or indexes 510, 520 can be associated with a particular application domain or a particular data service. The disclosed system may utilize data store systems like PostgreSQL (relational) and Apache Solr (non-relational, search server) interchangeably, sometimes for the same data, and can choose the one that best services the type of query requested. For example, the disclosed system can receive a query for data associated with a particular view or type of data. In response, the disclosed system can determine one or more of a type of the query, a type of the entity, an application or a device that sends the query, an application domain associated with the entity, or any relevant information associated with the query to determine one of the data store systems or a combination of such systems to use to respond to the query. Then the disclosed system can use the determined one of the data store systems or combinations of systems to respond to the query.

Batch Processing Workflow

Referring to FIGS. 1 and 2, as indicated by the arrow Batch 20, the lower portion of the diagram generally illustrates batch processing components of the system.

The Batch Processing Workflow can receive Large Uploads and Bulk Contributions 700 such as Raw Inputs 700

Universally Unique Identifier (uuid) attachment data

Message Digest 5 (md5) attachment data

In addition, the Batch Processing Workflow uses previously processed data such as previous FullProcessedInputs and previous QuickProcessedInputs for steps such as UUID Retention and Diff Generation. These steps are described below.

Pre Batch Build

Prior to initiating the Batch Build process, the real-time processed data can be provided to a data store 710, such as a Hadoop Distributed File System (HDFS), so they can be used as inputs for the Batch Build. When this step is initiated, the time can be recorded, that can be used during the Catchup Phase.

Specifically, the following data can be provided to the data store 710:

QuickProcessedSummaries 190—summaries that have been created since the last Batch Data Build. This may include brand new summaries, deleted summaries and summaries that have certain fields updated Unprocessed Inputs 350—the raw inputs that have been written to this dataset since the last Batch Data Build new uuid mappings—a mapping of input ids to entity ids for new summaries that were generated since the last batch run In some embodiments, quick processed inputs from the previous version of the data are not used, except for UUID Retention (described below). In such embodiments, this is accounted for by using the Unprocessed Inputs 350 instead. This ensures that inputs are completely reprocessed.

Batch Build

The Batch Build is a process in which the data can be processed and made ready for loading into production.

Input Processing:

Raw inputs 700 and Unprocessed Inputs 350 are fed into the Input Processing module 720 from HDFS 710. The Extract step may not preserve any notion that the data was previously extracted. Extraction may be done on the raw inputs 700.

The Extract step may use a rule framework that canonicalizes, cleans, fills in values and filters inputs as described above and as illustrated in the examples below.

123 main street=>123 Main St.

city: Los Angeles=>city: Los Angeles, state: CA

The Extract step can also sort out which inputs should be attached and which inputs should be batch-resolved. The Extract step can optionally determine that some inputs should be reviewed by a human, a computationally powerful process, or a third party API. The Extract step can set a moderation action flag within the metadata of the input and insert it directly or via API into the Stitch data store, which is used to coordinate relatively costly processes such as moderation.

Batch Resolve:

Batch resolve, which can be performed by the Resolve process module 722, may take the extracted inputs and group them based on whether they represent the same entity or not and assigns a unique id to each set of inputs. For example, batch resolve can assign a unique id generated by a) random assignment, b) concatenating one or more input values from a set of inputs (e.g. name+address), c) hashing of one or more values form an asset of inputs (e.g. md5 (name+address)), or d) taking the assigned id of an existing set of inputs if a sufficiently similar input exists (e.g. name, value, phone of new input is similar enough to name, value, phone of existing input).

UUID Retention:

After the batch resolve module 722 completes its process, the UUID Retention module 725 can be initiated. An objective of the UUID Retention module 725 can include modifying the identifier associated with entities (e.g., entity_id) so that a single entity, such as the Eiffel Tower, can maintain the same entity identifier even when input data is re-processed by the batch processes (e.g., across multiple batch runs). This enables an entity to be associated with the same identifier even when data associated with the entity is re-processed multiple times.

This is accomplished, for example, by reading in the previous FullProcessedInputs 360, and generating a mapping file or table, which includes a mapping between an input_id an entity_id. An input_id is a unique identifier assigned to each set of attributes coming from a single input data contribution. For example, all of the attributes pulled from the homepage of the French Laundry, such as the name, address, phone number constitute one input data contribution. Lots of other websites and contributors can also provide input data contributions describing the French Laundry. Each of these input data contributions has its own input_id that uniquely identifies it from other input data contributions. The input_id can include a message digest 5 (md5) hash of an input data contribution. In contrast, an entity_id is an identifier assigned to all of the input data contributions and the summary record of the French Laundry (currently a UUID).

In some embodiments, the input_id to entity_id mapping can be combined with the mappings for newly written summaries. For example, each input in FullProcessed Inputs and QuickProcessed Inputs has an input_id that uniquely identifies the original unprocessed input and an entity_id representing the entity associated with the FullProcessed Inputs and QuickProcessed Inputs, as determined by the Resolve process module 120. Using the input_id to entity_id mapping, the input_id can be used to assign the original entity_id to all inputs data items that are within the same set.

In some embodiments, an example of UUID Retention could be as follows:
Mapping:
input_id_0, original_entity_id
Input Set:
input_id_0, new_entity_id, data
input_id_1, new_entity_id, data
input_id_2, new_entity_id, data In this example, in the previous batch build, input_id_0, had the entity id "original_entity_id". In the current Batch Build, since the sample input set contains the input with input id: input_id_0, the disclosed system can map all inputs in the input set to original_entity_id. As such, in this example, the end result would be as follows
End Result:
input_id_0, original_entity_id, data
input_id_1, original_entity_id, data
input_id_2, original_entity_id, data The output of the UUID Retention module 725 can include a grouped set of inputs that have the same entity_ids as they had in the previous batch run, as well as preserving any entity_ids that were generated in between batch runs. As described above, the UUID Retention module 725 can preserve the same UUID for the same entity across Batch Builds.

In some cases entities may be merged or split, depending on the result of Batch Resolve. The UUID Retention module 725 can, in effect, specify how to deal with split and merge cases. For example, in the case of a merge, it may be preferred to use the entity_id with the greater number of inputs. In the case of a split, the entity_id may be assigned to the input set that has the greater number of inputs and generate a new id for the input cluster forming the new summary. This behavior can be customized depending on the dataset and desired outcome.

Data Attachment

After UUID Retention, the Data Attachment process may be performed by the Data Attachment module 727. A purpose of the Data Attachment process can be to attach inputs that are (1) unresolvable, (2) derived from a summary, (3) derived from an input, or (4) for inputs that with a sufficient degree of confidence, pertain to a specific entity_id, such as contributor edits to a specific entity_id or an input that has geocode information pertaining to a specific input.

Data attachment can be based on an entity_id or an input_id. For example, the Data Attachment module 727 can be configured to attach (or combine) a source input to a set of inputs generated from UUID Retention when the source input has the same entity_id as that of the set of inputs. As another example, the Data Attachment module 727 can be configured to attach (or combine) a source input when the source input is associated with the same parent input_id as that of the set of inputs, where the parent input id refers to a unique identifier of the input to which the source input should be attached. These examples are illustrated with the following embodiments.

In some embodiments, an example of Entity_ID Data Attachment could be as follows:
Attachment Data:
input_id_0, entity_id_0, data
Input Set:
input_id_1, entity_id_0, data
input_id_2, entity_id_0, data
input_id_3, entity_id_0, data In this example, since the sample input set and the source data have the same entity_id: entity_id_0, the attachment data is added to the sample input set.
End Result:
input_id_0, entity_id_0, data
input_id_1, entity_id_0, data
input_id_2, entity_id_0, data
input_id_3, entity_id_0, data In some embodiments, an example of Input_ID Data Attachment could be as follows:
Attachment Data:
input_id_0, (no entity id), parent_input_id: input_id_1, data
Input Set:
input_id_1, entity_id_0, data
input_id_2, entity_id_0, data
input_id_3, entity_id_0, data In this example, since the sample input set and contains an input that matches the parent input id of the source data, the attachment data is added to the sample input set.
End Result:
input_id_0, entity_id_0, data
input_id_1, entity_id_0, data
input_id_2, entity_id_0, data
input_id_3, entity_id_0, data Extended Attribute Set Extraction Extended Attribute Set Extraction is an additional extraction process performed by the extended attributes module 728. The extended attributes module 728 can be configured to run extraction on certain inputs to extract an "extended attribute set". An extended attribute set may not be a part of the core attribute set, but may contain information that pertains to specific views. For example, "vegan" is an attribute that would pertain to a restaurant view but not to a doctor's view.

In some embodiments, rules may be written in a rules framework that determines whether a set of inputs is re-extracted for extended attributes. For example, if a set of inputs has a single input that has the category "Restaurant", all inputs in that input set can be re-extracted for extended attributes pertaining to restaurants.

The output of the extended attributes module 728 include final inputs 729. The final inputs can be stored in the FullProcessed Inputs 360 storage, which may relay the final inputs to the quick summarization module 160.

Summarization

Summarization module 730 is configured to perform a summarization process. The summarization process includes a process by which the final representation of a set of inputs representing the same entity can be generated. Summarization module 730 can use a rules framework to generate a summary based on the final inputs 729. Each dataset may have multiple views, including side-effect views. Each set of inputs may generate multiple view summaries. Each of the summaries generated from the same set of inputs have the same entity_id.

A side-effect view includes a new view (e.g., set of summary entities) that does not have a one-to-one relationship with the entity id for the given inputs. A side-effect view can be generated as a by-product of other views and their inputs rather than directly producing summaries from the associated entity inputs. The side-effect view allows the summarization module 730 to provide an arbitrary number of summary records (e.g., an arbitrary number of related entities) from a single data input. One such example of this is Crosswalk, which is a view that links entity_ids to specific input sources. For instance, the side effect view creation process can determine whether an input data matches a rule, such as "is a namespace we track in crowsswalk" (e.g. because it has a url like webname.com/[some_place_id]), and once there is a match, the side effect view creation process can create a new entity, for example, with {"namespace":"webname", "id":"[some_place_id]", "factual_id":"[id_of referenced_entity]"}. Therefore, even if the input data is already associated with an entity, the side effect view creation process can generate additional entities associated with the input data based on a rule maintained by the side effect view creation process.

Following Summarization 730, the results may be filtered with High Confidence filter 740 and Low Confidence Filter 750 as described previously, and stored as FullProcessed Summaries 760.

Data Store Format Generation Process

In this process, the FullProcessedInputs 360 and FullProcessedSummaries 760 are built. FullProcessedInputs 360 can include all inputs for a given dataset and can be organized in a way where entity_id lookup and summarization is efficient. FullProcessedSummaries 760 can contain all the summary records for all views in a given dataset, organized in a way where entity_id and view_id lookup is efficient. These files can be bulk loaded into a data store during a MakeLive step. The output of these this step is represented by 729, 740, and 750 in FIG. 1.

Diff Generation

Diff Generation module 770 can be configured to generate all the "diff" records that comprise the difference between the current batch run and the prior real-time updated dataset and output them to Diff API to Download Partners 500, which allows authorized partners to download the difference records from the system. Each such record can be referred to as a "diff." Specific diff types are described above. Diffs can be generated by comparing each summary for a view against the prior version of the summary for that same view. Diffs can be generated for every view for each summary. The current summaries can be compared against the prior FullProcessedSummaries 760 and prior QuickProcessedSummaries 190 tables. The same diff generation mechanism can be used to generate the diffs for the indexes 510, 520, and the diff for third parties to be provided via the diff API 500.

The Diffs are also written to the Data store Format, which allows for efficient lookup based on date and entity_id.

Materialization Build

Materialization Build module 780 is configured to produce an output format that is ready for serving other computing systems, such as data stores. For example, the Materialization Build module 780 can be configured to build an inverted index (e.g., a data store) that allows for searching of the inputs. In some embodiments, the Materialization Build module 780 can be configured to build a materialization on a per-view basis. In other embodiments, the Materialization Build module 780 can be configured to build a materialization that includes multiple views.

In some embodiments, a simplified example of an inverted index materialization can include the following:
Sample Data:
doc_id_0, entity_id_0, view_id, Business, San Diego, Calif.
doc_id_1, entity_id_1, view_id, Business, San Francisco, Calif.
Index:
entity_id_0: {doc_id_0}
entity_id_1: {doc_id_1}
Business: {doc_id_0, doc_id_1}
San: {doc_id_0, doc_id_1}
Diego: {doc_id_0}
Francisco: {doc_id_1}
CA: {doc_id_0, doc_id_1}

Using the simplified index in the example, the data can be easily searchable by keyword or other attributes. For example, searching for "Diego", would yield summaries for doc_id_0 and doc_id_1 in this example.

If there are multiple views per materialization, the view_id could be used as an additional keyword filter for searches.

In some embodiments, each materialized data store can be associated with a particular application domain, a particular service, or a particular view. Therefore, when a system receives a query for data, the system can determine, based on the particular application domain, the particular service, and/or the particular view associated with the query and/or requested data, one or more of the materialized data stores to serve the query.

Batch Processing MakeLive

MakeLive is a process by which a Batch Build can be put into production. The MakeLive process can be accomplished through Data store Loading, Catchup and New Materialization Notification. After the MakeLive process is completed, all API requests can use the newly batch-built data.

Data Store Loading

Once a Batch Data Build passes all required regression and other Quality Assurance tests, a new table in the data store can be created with a new version number for FullProcessedInputs 360, FullProcessedSummaries 760, QuickProcesesdInputs 150, and QuickProcessedSummaries 190. The data store format files (FullProcessedInputs 360, FullProcessedSummaries 760) can be loaded into their respective new tables. Diffs 200/770 can be appended to an existing DiffTable.

In FIG. 1, the Real-Time Processing can refer to newly built FullProcessedInputs 360 and FullProcessedSummaries 760 through a data store-api-server once data store loading is complete. This can be accomplished by changing the pointer of the FullProcessedInputs 360 and FullProcessedSummaries 760 tables so that the newer tables are visible to Real-Time Processing and the older references are no longer visible to Real-Time Processing.

An example of the loading of FullProcessedInputs 360 is illustrated in the transition from 729 to 360 in FIG. 1. An example of the loading of FullProcessedSummaries 760 is illustrated in the transition from 740, 750 to 760 in FIG. 1.

Catchup Phase

During the time between when the batch run was started and when the Catchup Phase is first initiated, the data store may have taken additional real-time writes that were not processed during our Batch Build step. The real-time writes can refer to any writes that have been received in real-time and have generated QuickProcessed inputs. Once the Batch Build step is completed, thereby creating a newly batch built dataset, the Catchup Phase may update the newly batch built dataset, maintained in the indexed data stores 510, 520, or a Diff API to Download partners 500, based on these new real-time writes, so that the newly batch built dataset becomes up to date with the additional real-time writes.

Figure 3:
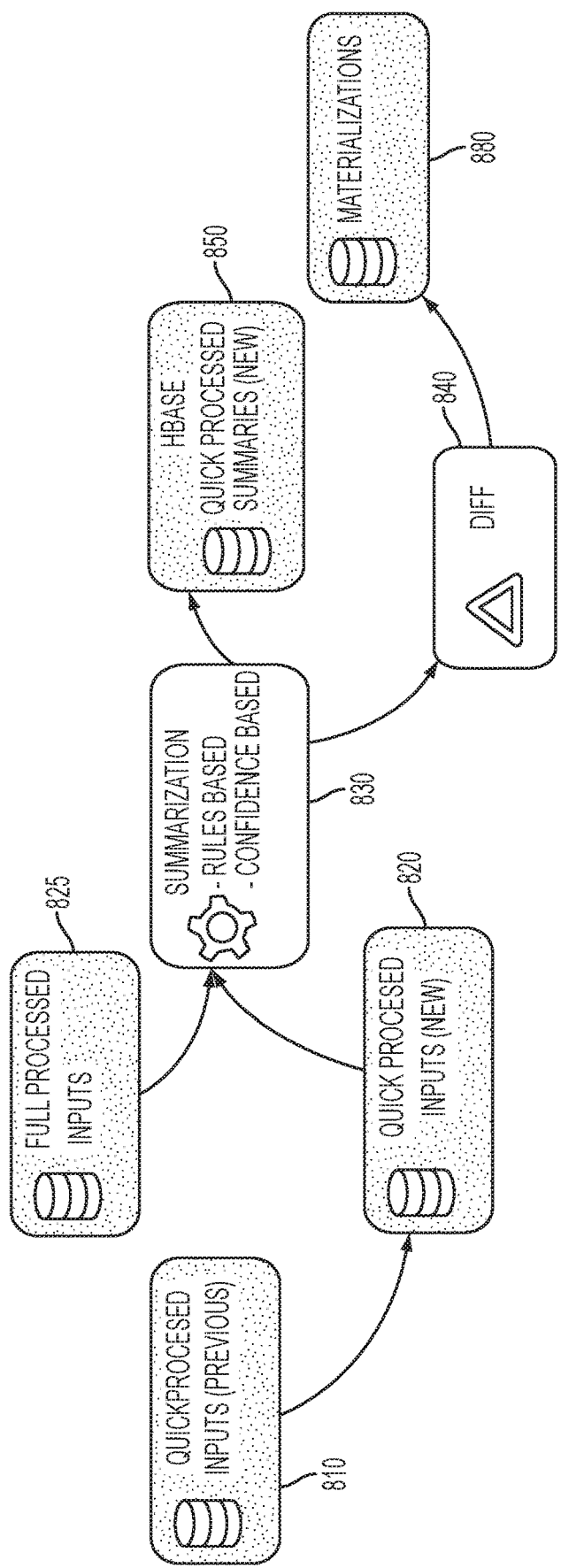
FIG. 3 illustrates the Catchup process in accordance with some embodiments.

FIG. 3 illustrates the Catchup process in accordance with some embodiments. To accomplish Catchup, the Quick Processed Inputs 810 from the prior version of the dataset can be each copied into the new Quick Processed Inputs 820, based on whether the timestamps of those inputs are after the timestamp at which the batch run was initiated. Specifically, each input in Quick Processed Inputs 810 can be added to the new Quick Processed Inputs 820 with the same entity_id (if it exists) for the new QuickProcessedInput table. If the same entity_id doesn't exist in the new QuickProcessedInput table, it can create a brand new input set for that entity_id. For each entity_id with an additional input, re-summarization 830 can be performed for all views. If the generated summaries are different from the inputs from FullProcessedSummaries, a diff is written to the DiffTable 840. The materialization 880 is in turn updated by any new Diffs 840.

New Materialization Data Store Notification

The final step for making a batch built dataset into production-ready dataset can include a process for enabling the FullProcessedInputs, FullProcessedSummaries, QuickProcessedInputs, and QuickProcessedSummaries tables. A flag can be cleared and the Summary Materialization versions can be updated to point to the newly built ones. This process can change the pointer from previous versions of 510 and 520 with the newest versions of the materializations built by the latest Batch Build.

The Unprocessed Inputs provided by the Real-Time Workflow at the Pre Batch Build step can be copied into the Unprocessed Inputs 350, so that they can be processed by the next Batch Data Build. The Unprocessed Inputs 350 can be deduplicated to prevent duplicate entries.

After these steps, all updates to the data can be handled by the Real-Time Data Processing workflow, until the next Scheduled Batch Data Build.

Embodiments of the disclosed system can be used in a variety of applications. For example, embodiments of the disclosed system can be used to gather and summarize data from various application domains, such as social networking, online advertisements, search engines, medical services, media services, consumer package goods, video games, support groups, or any other application domains from which a large amount of data is generated and maintained.

Executable Code Embodiments

Embodiments of the disclosed system may be built upon logic or modules comprising executable code. The executable code can be stored on one or more memory devices. Accordingly, a logic does not have to be located on a particular device. In addition, a logic or a module can be multiple executable codes located on one or more devices in the systems disclosed herein. For instance, access logic responsive to an input for accessing and retrieving data stored in one or more cells in the data store can be one executable code on an application server. In alternative embodiments, such access logic is found on one or more application servers. In still other embodiments, such access logic is found on one or more application servers and other devices in the system, including, but not limited to, "gateway" summary data servers and back-end data servers. The other logics disclosed herein also can be one or more executable code located on one or more devices within a collaborative data system.

In certain embodiments, the disclosed systems comprise one or more application servers, as well as one or more summary data servers, and one or more back-end data servers. The servers comprise memory to store the logics disclosed herein. In particular embodiments, the one or more application servers store the logics necessary to perform the tasks disclosed herein. In other embodiments, the summary servers store the logics necessary to perform the tasks disclosed herein. In other embodiments, the back-end servers store the logics necessary to perform the tasks disclosed herein.

In certain embodiments, the client web browser makes requests to the one or more application servers. Alternatively, the disclosed systems comprise one or more summary or back-end data servers to which the client web browser makes requests.

In an exemplary embodiment, the one or more application servers receive requests from the client web browser for specific data or tables. Upon these requests, the one or more application servers calls upon one or more data store servers to request summary or detail data from cells or tables. The one or more application servers also call upon the one or more data store servers when a request to submit new data inputs is made. The one or more application servers receive the data from the one or more summary servers and the one or more application servers generate HTML and JavaScript objects to pass back to the client web browser. Alternatively, the one or more application servers generate XML or JSON to pass objects through an API.

In one embodiment, the data store servers are based on an architecture involving a cluster of summary data servers and a cluster of back-end data servers. Note, however, that a system could include a single summary server and back-end data server. In this embodiment, the array of summary data servers are utilized to request from back-end data servers, summary data and attributes of such summarized data points (confidence, counts, etc.). The array of summary servers also caches such summary data and summary attributes so that faster access to such summary data can be access without the need for an additional request to the back-end data server.

The present systems and processes rely on executable code (i.e., logic) stored on memory devices. Memory devices capable of storing logic are known in the art. Memory devices include storage media such as computer hard disks, redundant array of inexpensive disks ("RAID"), random access memory ("RAM"), and optical disk drives. Examples of generic memory devices are well known in the art (e.g., U.S. Pat. No. 7,552,368, describing conventional semiconductor memory devices and such disclosure being herein incorporated by reference).

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. A computing system for generating a summary data of a set of data, the computing system comprising:
one or more processors configured to run one or more modules stored in non-transitory computer readable medium, wherein the one or more modules are configured to:
receive a first set of data, wherein the first set of data includes information on web pages and the information on web pages is received from a web crawler, and format the first set of data into a first structured set of data;
generate a first summary data using the first structured set of data, the first summary data includes a first entity identifier and a first value associated with the first entity identifier, and store the first summary data in a data store;
receive a second set of data, wherein the second set of data includes data from a user to correct the information on web pages and the data is received from an electronic device of the user, and format the second set of data into a second structured set of data;

generate a second summary data using the first structured set of data and the second structured set of data, the second summary data includes a second entity identifier and a second value associated with the second entity identifier;

compare the first summary data in the data store with the second summary data;

determine that the first entity identifier and the second entity identifier are identical;

determine a difference between the first value and the second value; and update the first summary data in the data store based on the difference between the first value and the second value.

2. The computing system of claim 1, wherein the first set of data comprises a larger number of data items compared to the second set of data.

3. The computing system of claim 1, wherein the second set of data comprises real-time data submissions.

4. The computing system of claim 1, wherein the one or more modules are further configured to provide the difference between the first value and the second value to other authorized computing systems.

5. The computing system of claim 4, wherein the one or more modules are further configured to provide the difference to other authorized computing systems via an application programming interface.

6. The computing system of claim 4, wherein the one or more modules are further configured to provide the difference to other authorized computing systems as a file.

7. The computing system of claim 1, wherein the one or more modules are configured to:
combine at least the first set of data and the second set of data and generate a third set of data including the combined first set of data and second set of data;
format the third set of data into a third structured set of data; and
generate a third summary data using the third structured set of data.

8. The computing system of claim 7, wherein the first set of data and the third set of data each includes a first data element, and wherein the first data element of the first set of data is associated with a first entity in the first summary data identified by the first entity identifier, wherein the first data element of the third set of data is associated with another entity in the third summary data, and wherein the one or more modules are further configured to associate the first entity identifier to the other entity in the third summary data so that the first data element of the first set of data maintains its association with the other entity in the third summary data.

9. The computing system of claim 1, wherein the first structured set of data comprises a grouping of data items based on the first entity identifier associated with the data items.

10. The computing system of claim 1, wherein the computing system comprises at least one server in a data center.

11. The computing system of claim 1, wherein the data store comprises a plurality of database systems, each of which is associated with a view, and wherein the one or more modules are configured to select one of the plurality of database systems in response to a query based on the view associated with the query.

12. The computing system of claim 1, wherein the one or more modules are configured to:
receive a third set of data and determine a third entity identifier and a third value associated with the third entity identifier from the third set of data;
determine that the second entity identifier and the third entity identifier are identical;
determine a difference between the second value and the third value; and
update the first summary data in the data store based on the difference between the second value and the third value.

13. A method for generating a summary data of a set of data, the method comprising:
receiving, at an input module operating on a processor of a computing system, a first set of data and processing, at a first input processing module of the computing system, the first set of data to produce a first structured set of data, wherein the first set of data includes information on web pages and the information on web pages is received from a web crawler;
generating, at a first summary generation module of the computing system, a first summary data using the first structured set of data, the first summary data including a first entity identifier and a first value associated with the first entity identifier, and maintaining the first summary data in a data store in the computing system;
receiving, at the input module operating on the processor of the computing system, a second set of data and processing, at a second input processing module of the computing system, the second set of data to produce a second structured set of data, wherein the second set of data includes data from a user to correct the information on web pages and the data is received from an electronic device of the user;
generating, at a second summary generation module of the computing system, a second summary data using the first structured set of data and the second structure set of data, the second summary data including a second entity identifier and a second value associated with the second entity identifier;
determining, at an identity generation module of the computing system, that the first entity identifier in the first summary data maintained in the data store and the second entity identifier in the secondary summary data are identical;
determining, at a difference generation module of the computing system, a difference between the first value and the second value; and
updating, by the computing system, the first summary data in the data store based on the difference between the first value and the second value.

14. The method of claim 13, wherein the step of receiving the first set of data comprises receiving a larger number of data items than that of the step of receiving the second set of data.

15. The method of claim 13, wherein the step of receiving the second set of data comprises receiving real-time data submissions.

16. The method of claim 13, further comprising:
combining at least the first set of data and the second set of data and generating a third set of data including the combined the first set of data and the second set of data,
formatting the third set of data into a third structured set of data; and
generating a third summary data using the third structured set of data.

17. The method of claim 16, further comprising associating a first data element of the first set of data with a first entity in the first summary data identified by the first entity identifier, associating another first data element of the third set of data with another entity in the third summary data, and wherein the method further comprising associating the first entity identifier to the other entity in the third summary data so that the first data element maintains its association with the other entity in the third summary data.

18. A computer program product, tangibly embodied in a non-transitory computer-readable storage medium, the computer program product including instructions configured to cause a data processing system to perform operations, comprising:

receiving a first set of data, wherein the first set of data includes information on web pages and the information on web pages is received from a web crawler, and formatting the first set of data into a first structured set of data;

generating a first summary data using the first structured set of data, the first summary data includes a first entity identifier and a first value associated with the first entity identifier, and store the first summary data in a data store;

receiving a second set of data, wherein the second set of data includes data from a user to correct the information on web pages and the data is received from an electronic device of the user, and formatting the second set of data into a second structured set of data;

generating a second summary data using the first structured set of data and the second structured set of data, the second summary data includes a second entity identifier and a second value associated with the second entity identifier;

comparing the first summary data in the data store with the second summary data;

determining that the first entity identifier and the second entity identifier are identical;

determining a difference between the first value and the second value; and updating the first summary data in the data store based on the difference between the first value and the second value.

19. The computer program product of claim 18, wherein the first set of data comprises a larger number of data items compared to the second set of data.

20. The computer program product of claim 18, wherein the second set of data comprises real-time data submissions.

21. A computing system for generating a summary data of a set of data, the computing system comprising:

one or more processors configured to run one or more modules stored in non-transitory computer readable medium, wherein the one or more modules are configured to:

receive a first set of data over a first period of time and format the first set of data received over the first period of time into a first structured set of data;

generate a first summary data using the first structured set of data, the first summary data includes a first entity identifier and a first value associated with the first entity identifier, and store the first summary data in a data store;

receive a second set of data over a second period of time and format the second set of data received over the second period of time into a second structured set of data, wherein the step of receiving and formatting the second set of data is performed more frequently than the step of receiving and formatting the first set of data, and the second period of time is shorter than the first period of time;

generate a second summary data using the first structured set of data obtained from the first period of time and the second structured set of data obtained from the second period of time, the second summary data includes a second entity identifier and a second value associated with the second entity identifier;

determine that the first entity identifier and the second entity identifier are identical;

determine a difference between the first value and the second value; and update the first summary data in the data store based on the difference between the first value and the second value.

* * * * *